United States Patent
Kotato et al.

(10) Patent No.: US 8,574,757 B2
(45) Date of Patent: Nov. 5, 2013

(54) NONAQUEOUS ELECTROLYTIC SOLUTION AND NONAQUEOUS ELECTROLYTE BATTERY

(75) Inventors: Minoru Kotato, Inashiki-gun (JP); Shinichi Kinoshita, Inashiki-gun (JP)

(73) Assignee: Mitsubishi Chemical Corporation, Tokyo (JP)

(*) Notice: Subject to any disclaimer, the term of this patent is extended or adjusted under 35 U.S.C. 154(b) by 0 days.

(21) Appl. No.: 13/538,584

(22) Filed: Jun. 29, 2012

(65) Prior Publication Data

US 2012/0264011 A1 Oct. 18, 2012

Related U.S. Application Data

(62) Division of application No. 13/397,197, filed on Feb. 15, 2012, which is a division of application No. 12/525,188, filed as application No. PCT/JP2008/054880 on Mar. 17, 2008.

(30) Foreign Application Priority Data

| Mar. 19, 2007 | (JP) | 2007-070848 |
| Jul. 25, 2007 | (JP) | 2007-193525 |
| Sep. 11, 2007 | (JP) | 2007-235600 |

(51) Int. Cl.
    *H01M 6/14* (2006.01)

(52) U.S. Cl.
    USPC ............ 429/200; 429/199; 429/324; 429/341; 429/307; 252/62.2

(58) Field of Classification Search
    USPC .......... 429/200, 199, 324, 341, 307; 252/62.2
    See application file for complete search history.

(56) References Cited

U.S. PATENT DOCUMENTS

| 6,210,840 | B1 | 4/2001 | Usami et al. |
| 6,664,008 | B1 | 12/2003 | Suzuki et al. |
| 6,800,400 | B2 | 10/2004 | Ota et al. |
| 6,919,145 | B1 | 7/2005 | Kotato et al. |
| 6,929,885 | B2 | 8/2005 | Kotato et al. |
| 6,942,948 | B2 | 9/2005 | Takehara et al. |
| 7,083,878 | B2 | 8/2006 | Kotato et al. |
| 7,169,511 | B2 | 1/2007 | Noda et al. |
| 7,575,833 | B2 | 8/2009 | Kotato et al. |
| 8,007,938 | B2 | 8/2011 | Kotato et al. |
| 8,043,745 | B2 | 10/2011 | Kotato et al. |
| 2002/0192564 | A1 | 12/2002 | Ota et al. |
| 2005/0008939 | A1 | 1/2005 | Ota et al. |
| 2007/0037063 | A1 | 2/2007 | Choi et al. |
| 2007/0178379 | A1 | 8/2007 | Tamura et al. |
| 2007/0224514 | A1 | 9/2007 | Kotato et al. |
| 2010/0021823 | A1 | 1/2010 | Onuki et al. |
| 2011/0229771 | A1 | 9/2011 | Onuki et al. |
| 2011/0300453 | A1 | 12/2011 | Kotato et al. |

FOREIGN PATENT DOCUMENTS

| CN | 1411619 A | 4/2003 |
| EP | 1 598 895 A1 | 11/2005 |
| EP | 2 031 689 A1 | 3/2009 |
| JP | 10-189039 | * 7/1998 |
| JP | 10 189039 | 7/1998 |
| JP | 11 67270 | 3/1999 |
| JP | 11 185806 | 7/1999 |
| JP | 11 233141 | 8/1999 |
| JP | 2002 319431 | 10/2002 |
| JP | 2004 363077 | 12/2004 |
| JP | 2005 251456 | 9/2005 |
| JP | 2006-86058 | 3/2006 |
| JP | 2006 196250 | 7/2006 |
| JP | 2007 19027 | 1/2007 |
| WO | 2005 114773 | 12/2005 |
| WO | WO 2006/030681 A1 | 3/2006 |
| WO | 2006 134653 | 12/2006 |
| WO | WO 2007/142121 A1 | 12/2007 |

OTHER PUBLICATIONS

Office Action issued Oct. 23, 2012 in Japanese Patent Application No. 2007-193525.
Office Action issued Oct. 23, 2012 in Japanese Patent Application No. 2008-067995.
Office Action issued on Jul. 14, 2011 in the corresponding European Application No. 08 722 275.8.
Office Action issued Jun. 9, 2011, in Chinese Patent Application No. 200880006114.X (with English-language translation).
Office Action issued May 3, 2012 in Chinese Patent Application No. 200880006114.X (with English translation).
European Office Minutes issued Mar. 29, 2012, in Patent Application No. 08 722 275.8.

(Continued)

*Primary Examiner* — Laura Weiner
(74) *Attorney, Agent, or Firm* — Oblon, Spivak, McClelland, Maier & Neustadt, L.L.P.

(57) ABSTRACT

A nonaqueous electrolytic solution that can provide a battery that is low in gas generation, has a large capacity, and is excellent in storage characteristics and cycle characteristics. The solution contains an electrolyte, a nonaqueous solvent, and one or more compounds represented by Formulae (2) and (3):

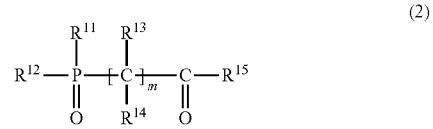

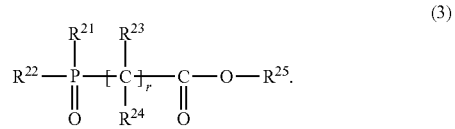

19 Claims, No Drawings

(56) References Cited

OTHER PUBLICATIONS

European Office Action issued Mar. 28, 2012, in Patent Application No. 10 167 654.2.

Chinese Office Action issued Oct. 19, 2012 in Patent Application No. 200880006114.X with English Translation.

European Office Action dated Aug. 14, 2013 issued in corresponding European Patent Application No. 10 167 654.2.

* cited by examiner

NONAQUEOUS ELECTROLYTIC SOLUTION AND NONAQUEOUS ELECTROLYTE BATTERY

CROSS-REFERENCE TO RELATED APPLICATIONS

This application is a Divisional of U.S. patent application Ser. No. 13/397,197 filed Feb. 15, 2012 which is a Divisional of U.S. patent application Ser. No. 12/525,188 filed Jul. 30, 2009 which is a National Stage of PCT/JP08/054,880 filed Mar. 17, 2008 and claims priority of Japanese Patent Application No. 2007-070848 filed Mar. 19, 2007, Japanese Patent Application No. 2007-193525 filed Jul. 25, 2007 and Japanese Patent Application No. 2007-235600 filed Sep. 11, 2007, the entire contents of which are hereby incorporated by reference.

FIELD OF THE INVENTION

The present invention relates to a nonaqueous electrolytic solution and a nonaqueous electrolyte battery using the same.

BACKGROUND OF THE INVENTION

Nonaqueous electrolyte batteries such as lithium secondary batteries have been putting into practical use for various purposes, for example, from so-called household power sources for mobile phones, notebook computers, and so on to driving batteries equipped on vehicles such as automobiles.

However, recent requirements for high-performance nonaqueous electrolyte batteries have become higher and higher, and battery characteristics are desired to be improved.

In general, the electrolytic solution used in a nonaqueous electrolyte battery is mainly composed of an electrolyte and a nonaqueous solvent. As the main component of the nonaqueous solvent, for example, a cyclic carbonate such as ethylene carbonate or propylene carbonate, a chain carbonate such as dimethyl carbonate, diethyl carbonate, or ethyl methyl carbonate, or a cyclic carboxylate such as γ-butyrolactone or γ-valerolactone is used.

In addition, in order to improve the battery characteristics, such as load characteristics, cycle characteristics, and storage characteristics, of these nonaqueous electrolyte batteries, various investigations of nonaqueous solvents and electrolytes have been performed.

For example, Patent Document 1 proposes an electrolytic solution containing a phosphinic ester for producing a battery in which degradation in battery performance during high-temperature storage is suppressed.

Patent Document 2 proposes an electrolytic solution containing a phosphonoacetate for producing a nonaqueous electrolyte secondary battery that is safe because of its high flame retardancy and can generate a high voltage and also is excellent in charge and discharge.

Patent Document 3 proposes an electrolytic solution containing a phosphonoacetate for producing a battery excellent in flame retardancy.

Patent Document 4 proposes the use of a mixture of an asymmetric chain carbonate and a cyclic carbonate having a double bond as a nonaqueous solvent. By using this mixture, the cyclic carbonate having a double bond preferentially reacts with a negative electrode to form a high-quality film on the surface of the negative electrode, and thereby the asymmetric chain carbonate is prevented from forming a nonconductive film on the surface of the negative electrode, resulting in enhancements in storage characteristics and cycle characteristics.

However, recent requirements for high-performance batteries have become higher and higher, and it is required to achieve high capacity, high-temperature storage characteristics, and cycle characteristics at high levels.

As a method of increasing the capacity, it has been investigated to fill the restricted battery content with an active material in an amount as large as possible. In general, the active material layer of an electrode is pressurized to increase the density, or a battery is designed such that the volume of materials other than the active material in the battery is reduced as much as possible. However, when the active material layer of an electrode is pressurized to increase the density or the amount of an electrolytic solution is decreased, the active material cannot be uniformly used and degradation of the active material is accelerated by uneven reaction. This tends to cause a problem in which sufficient characteristics cannot be obtained. Furthermore, an increase in the capacity of a battery causes a decrease in the space inside the battery. This also causes a problem in which the internal pressure of the battery is significantly increased even if the amount of gas generated by decomposition of the electrolytic solution is small.

In particular, in most cases using a nonaqueous electrolyte secondary battery as a power supply in case of power outage or as a power supply of portable equipment, the battery always supplies an extremely weak current for compensating the self-discharge of the battery and is always in a state of charging. In such a continuous charging state, the electrode active material is always in a high activity state, and, simultaneously, heat generated by the equipment accelerates a decrease in the capacity of the battery or decomposition of the electrolytic solution to tend to generate gas. In a battery that opens a relief valve when an abnormal increase in the internal pressure, due to abnormality such as overcharge, is detected, the relief valve may be falsely opened if a large amount of gas is generated. In a battery not having a relief valve, the battery expands by the pressure of the generated gas, and the battery itself may become disabled.

The nonaqueous electrolyte secondary battery including the electrolytic solution described in Patent Document 1 is still unsatisfactory in suppression of gas generation, high-temperature storage characteristics, and cycle characteristics, as described above.

In the nonaqueous electrolyte secondary battery including the electrolytic solution described in Patent Document 2 or 3, since the phosphonoacetate contained in the electrolytic solution has a hydrogen atom on the α-position of the carbonyl group, it is suggested that elimination reaction of hydrogen tends to occur in reductive decomposition on the negative electrode side. Thus, battery characteristics are still unsatisfactory.

The nonaqueous electrolyte secondary battery including the electrolytic solution described in Patent Document 4 is also still unsatisfactory in suppression of the gas generation and high-temperature storage characteristics, as described above.

[Patent Document 1] Japanese Patent Publication 2004-363077A
[Patent Document 2] Japanese Patent Publication H10-189039A
[Patent Document 3] Japanese Patent Publication H11-233141A
[Patent Document 4] Japanese Patent Publication H11-185806A

SUMMARY OF THE INVENTION

It is an object of the present invention to provide a nonaqueous electrolytic solution that can realize a nonaqueous electrolyte battery that is low in gas generation, has a high capacity, and is excellent in storage characteristics and cycle characteristics, and to provide a nonaqueous electrolyte battery including this nonaqueous electrolytic solution.

The present inventors have conducted various investigations for achieving the above-mentioned object and, as a result, have found that the above-mentioned problems can be solved by adding a compound having a specific structure to an electrolytic solution. Thus, the present invention has been accomplished.

A nonaqueous electrolytic solution of a first aspect of the present invention relates to a nonaqueous electrolytic solution containing an electrolyte and a nonaqueous solvent dissolving the electrolyte, wherein the nonaqueous electrolytic solution contains 0.001 vol % or more and less than 1 vol % of a compound represented by the following Formula (1) in the nonaqueous solvent.

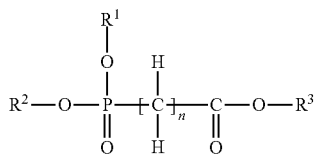
(1)

In Formula (1), $R^1$ to $R^3$ each independently represent an alkyl group of 1 to 12 carbon atoms, which may be substituted by a halogen atom; and n represents an integer of 0 to 6.

A nonaqueous electrolytic solution of a second aspect of the present invention relates to a nonaqueous electrolytic solution containing an electrolyte and a nonaqueous solvent dissolving the electrolyte, wherein the nonaqueous electrolytic solution contains 0.001 vol % or more and less than 5 vol % of a compound represented by the following Formula (1) in the nonaqueous solvent and further contains at least one compound selected from the group consisting of cyclic carbonate compounds having carbon-carbon unsaturated bonds, cyclic carbonate compounds having fluorine atoms, monofluorophosphates, and difluorophosphates.

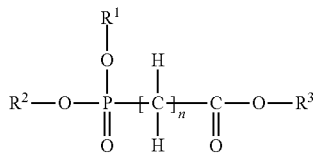
(1)

In Formula (1), $R^1$ to $R^3$ each independently represent an alkyl group of 1 to 12 carbon atoms, which may be substituted by a halogen atom; and n represents an integer of 0 to 6.

A nonaqueous electrolytic solution of a third aspect of the present invention relates to a nonaqueous electrolytic solution containing an electrolyte and a nonaqueous solvent dissolving the electrolyte, wherein the nonaqueous electrolytic solution contains a compound represented by the following Formula (2) and/or a compound represented by the following Formula (3).

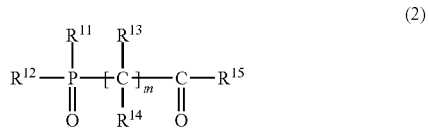
(2)

In Formula (2), $R^{11}$ to $R^{14}$ each independently represent a hydrogen atom, a halogen atom, or a monovalent substituent of 1 to 12 carbon atoms; $R^{15}$ represents an alkyl group of 1 to 12 carbon atoms, which may be substituted by a halogen atom, an alkenyl group of 2 to 12 carbon atoms, which may be substituted by a halogen atom, an aryl group of 6 to 12 carbon atoms, which may be substituted by a halogen atom, or an aralkyl group of 7 to 12 carbon atoms, which may be substituted by a fluorine atom; and m represents an integer of 0 to 6.

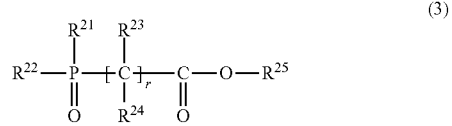
(3)

hydrogen atom, a halogen atom, or a monovalent substituent of 1 to 12 carbon atoms; $R^{25}$ represents an alkyl group of 1 to 12 carbon atoms, which may be substituted by a halogen atom, an alkenyl group of 2 to 12 carbon atoms, which may be substituted by a halogen atom, an aryl group of 6 to 12 carbon atoms, which may be substituted by a halogen atom, or an aralkyl group of 7 to 12 carbon atoms, which may be substituted by a halogen atom; and r represents an integer of 0 to 6, wherein when both $R^{21}$ and $R^{22}$ are alkoxy groups, r represents an integer of 1 to 6, and at least one of $R^{23}$ and $R^{24}$ represent a group other than a hydrogen atom.

A nonaqueous electrolyte battery of a fourth aspect of the present invention relates to a nonaqueous electrolyte battery including a nonaqueous electrolytic solution and negative and positive electrodes that can absorb and desorb lithium ions, wherein the nonaqueous electrolytic solution is the nonaqueous electrolytic solution according to any of the first to third aspects.

According to the present invention, a nonaqueous electrolyte battery that is low in gas generation, has a high capacity, and is excellent in storage characteristics and cycle characteristics can be provided, and the nonaqueous electrolyte battery can be reduced in size and can be enhanced in performance.

DETAILED DESCRIPTION OF THE INVENTION

Embodiments of the present invention will be described in detail below, but the following descriptions of elements are examples (typical examples) of the aspects of the present invention, and the present invention is not limited to these contents.

[Nonaqueous Electrolytic Solution]

The nonaqueous electrolytic solution of the present invention contains an electrolyte and a nonaqueous solvent dissolving the electrolyte, in general, as main components, as in commonly used nonaqueous electrolytic solutions.

{Electrolyte}

The electrolyte used is generally a lithium salt. Any lithium salt can be used without particular limitation, as long as it is known to be used for this purpose. Specifically, the followings are exemplified.

Examples include inorganic lithium salts such as $LiPF_6$ and $LiBF_4$; fluorine-containing organic lithium salts such as $LiCF_3SO_3$, $LiN(CF_3SO_2)_2$, $LiN(C_2F_5SO_2)_2$, lithium cyclic 1,2-perfluoroethane disulfonyl imide, lithium cyclic 1,3-perfluoropropane disulfonyl imide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, and $LiBF_2(C_2F_5SO_2)_2$; and lithium bis(oxalate)borate and lithium difluoro(oxalate)borate.

Among them, $LiPF_6$, $LiBF_4$, $LiCF_3SO_3$, $LiN(CF_3SO_2)_2$ and $LiN(C_2F_5SO_2)_2$ are preferred from the viewpoint of the enhancement of battery performance, and $LiPF_6$ and $LiBF_4$ are particularly preferred.

These lithium salts may be used alone or in a combination of two or more.

A preferred example of the combination of at least two lithium salts is a combination of $LiPF_6$ and $LiBF_4$, which has an effect to enhance the cycle characteristics. In this case, the ratio of $LiBF_4$ to the total amount of the both is preferably 0.01 wt % or more and more preferably 0.1 wt % or more and preferably 20 wt % or less and more preferably 5 wt % or less. When the ratio is less than this lower limit, a desired effect may be hardly obtained. When the ratio is higher than the upper limit, the battery characteristics after high-temperature storage may be deteriorated.

Another combination example is a combination of an inorganic lithium salt and a fluorine-containing organic lithium salt. In this case, the ratio of the inorganic lithium salt to the total amount of the both is desirably 70 wt % or more and 99 wt % or less. The fluorine-containing lithium salt in the combination is preferably $LiN(CF_3SO_2)_2$, $LiN(C_2F_5SO_2)_2$, lithium cyclic 1,2-perfluoroethane disulfonyl imide, or lithium cyclic 1,3-perfluoropropane disulfonyl imide. This combination has an effect of suppressing degradation due to high-temperature storage.

Furthermore, when the nonaqueous solvent contains 55 vol % or more of γ-butyrolactone, the lithium salt is preferably a combination of $LiBF_4$ or $LiBF_4$ and another lithium salt. In this case, the amount of $LiBF_4$ is preferably 40 mol % or more to the total amount of the lithium salts. Particularly preferred are combinations of $LiBF_4$ at a ratio of 40 mol % or more and 95 mol % or less to the lithium salts and one or more selected from the group consisting of $LiPF_6$, $LiCF_3SO_3$, $LiN(CF_3SO_2)_2$, and $LiN(C_2F_5SO_2)_2$ as the residue.

The concentration of these electrolytes in the nonaqueous electrolytic solution is not particularly limited in order to exhibit the effect of the present invention, but is usually 0.5 mol/L or more, preferably 0.6 mol/L or more, and more preferably 0.7 mol/L or more. The upper limit thereof is usually 3 mol/L or less, preferably 2 mol/L or less, more preferably 1.8 mol/L or less, and most preferably 1.5 mol/L or less. When the concentration of the electrolyte is too low, the electrical conductivity of the electrolytic solution may be insufficient. On the other hand, when the concentration is too high, the electrical conductivity may be decreased due to an increase in viscosity, resulting in deterioration in battery performance.

{Nonaqueous Solvent}

The nonaqueous solvent can be adequately selected from those that are conventionally used as solvents of nonaqueous electrolytic solutions. Examples thereof include cyclic carbonates not having carbon-carbon unsaturated bonds, chain carbonates, cyclic ethers, chain ethers, cyclic carboxylates, chain carboxylates, sulfur-containing organic solvents, and phosphorus-containing organic solvents.

Examples of the cyclic carbonates not having carbon-carbon unsaturated bonds include alkylene carbonates having an alkylene group of 2 to 4 carbon atoms, such as ethylene carbonate, propylene carbonate, and butylene carbonate. Among them, ethylene carbonate and propylene carbonate are preferred from the viewpoint of enhancement of the battery characteristics, and ethylene carbonate is particularly preferred.

The chain carbonates are preferably dialkyl carbonates, and the numbers of the carbon atoms of the constituting alkyl groups are each preferably one to five and more preferably one to four. Examples of the dialkyl carbonates include symmetric chain alkyl carbonates such as dimethyl carbonate, diethyl carbonate, and di-n-propyl carbonate; and asymmetric chain alkyl carbonates such as ethyl methyl carbonate, methyl-n-propyl carbonate, and ethyl-n-propyl carbonate. Among them, dimethyl carbonate, diethyl carbonate, and ethyl methyl carbonate are preferred from the viewpoint of enhancement of the battery characteristics (in particular, high-load discharge characteristics).

Examples of the cyclic ethers include tetrahydrofuran and 2-methyltetrahydrofuran.

Examples of the chain ethers include dimethoxyethane and dimethoxymethane.

Examples of the cyclic carboxylates include γ-butyrolactone and γ-valerolactone.

Examples of the chain carboxylates include methyl acetate, methyl propionate, ethyl propionate, and methyl butyrate.

Examples of the sulfur-containing organic solvents include sulfolane, 2-methylsulfolane, 3-methylsulfolane, and diethylsulfone.

Examples of the phosphorus-containing organic solvents include trimethyl phosphate, triethyl phosphate, dimethyl ethyl phosphate, methyl diethyl phosphate, ethylene methyl phosphate, and ethylene ethyl phosphate.

These nonaqueous solvents may be used alone or in a combination of two or more, but a combination of two or more compounds is preferred. For example, a combination of a high-dielectric solvent such as an alkylene carbonate or a cyclic carboxylate and a low-viscosity solvent such as a dialkyl carbonate or a chain carboxylate is preferred.

One preferred combination of the nonaqueous solvents is a combination of an alkylene carbonate and a dialkyl carbonate as the main components. In such a combination, the total amount of the alkylene carbonate and the dialkyl carbonate in the nonaqueous solvent is 70 vol % or more, preferably 80 vol % or more, and more preferably 90 vol % or more; and the ratio of the alkylene carbonate to the total amount of the alkylene carbonate and the dialkyl carbonate is 5 vol % or more, preferably 10 vol % or more, and more preferably 15 vol % or more and usually 50 vol % or less, preferably 35 vol % or less, more preferably 30 vol % or less, and most preferably 25 vol % or less. The use of such a combination of the nonaqueous solvents in a battery gives well-balanced cycle characteristics and high-temperature storage characteristics (in particular, the remaining capacity after high-temperature storage and high-load discharge capacity) and is therefore preferred.

Examples of the preferred combination of an alkylene carbonate and a dialkyl carbonate include combinations of ethylene carbonate and dimethyl carbonate, ethylene carbonate and diethyl carbonate, ethylene carbonate and ethyl methyl carbonate, ethylene carbonate and dimethyl carbonate and diethyl carbonate, ethylene carbonate and dimethyl carbonate and ethyl methyl carbonate, ethylene carbonate and diethyl carbonate and ethyl methyl carbonate, and ethylene carbonate and dimethyl carbonate and diethyl carbonate and ethyl methyl carbonate.

A combination in which propylene carbonate is further added to a combination of ethylene carbonate and a dialkyl carbonate is also a preferred example.

In the combination in which propylene carbonate is further added to a combination of ethylene carbonate and a dialkyl carbonate, the volume ratio of ethylene carbonate and propylene carbonate is preferably 99:1 to 40:60 and more preferably 95:5 to 50:50. In addition, the ratio of propylene carbonate to the total amount of the nonaqueous solvent is usually 0.1 vol % or more, preferably 1 vol % or more, and more preferably 2 vol % or more, and the upper limit thereof is usually 20 vol % or less, preferably 8 vol % or less, and more preferably 5 vol % or less. The addition of propylene carbonate in this concentration range further provides excellent low-temperature characteristics, while maintaining the characteristics of the combination of ethylene carbonate and a dialkyl carbonate, and is therefore preferred.

Among the combinations of ethylene carbonate and a dialkyl carbonate, those containing an asymmetric chain alkyl carbonate as the dialkyl carbonate are further preferred. In particular, those containing ethylene carbonate and a symmetric chain alkyl carbonate and an asymmetric chain alkyl carbonate, such as ethylene carbonate and dimethyl carbonate and ethyl methyl carbonate, ethylene carbonate and diethyl carbonate and ethyl methyl carbonate, and ethylene carbonate and dimethyl carbonate and diethyl carbonate and ethyl methyl carbonate, give well-balanced cycle characteristics and large-current discharge characteristics and are therefore preferred. Among them, the asymmetric chain alkyl carbonate is preferably ethyl methyl carbonate, and the alkyl group of the alkyl carbonate preferably has one or two carbon atoms.

In addition, in the case of the nonaqueous solvent containing diethyl carbonate, the gas generation in high-temperature storage is suppressed when the ratio of diethyl carbonate to the total amount of the nonaqueous solvent is usually 10 vol % or more, preferably 20 vol % or more, more preferably 25 vol % or more, and most preferably 30 vol % or more and the upper limit is usually 90 vol % or less, preferably 80 vol % or less, more preferably 75 vol % or less, and most preferably 70 vol % or less, and therefore such a range is preferred.

In addition, in the case of the nonaqueous solvent containing dimethyl carbonate, the load characteristics of the battery is enhanced when the ratio of dimethyl carbonate to the total amount of the nonaqueous solvent is usually 10 vol % or more, preferably 20 vol % or more, more preferably 25 vol % or more, and most preferably 30 vol % or more and the upper limit is usually 90 vol % or less, preferably 80 vol % or less, more preferably 75 vol % or less, and most preferably 70 vol % or less, and therefore such a range is preferred.

In addition, in the above-mentioned combinations including an alkylene carbonate and a dialkyl carbonate as main components, another solvent may be further mixed therewith.

Other examples of the preferred nonaqueous solvent are those in which one organic solvent selected from the group consisting of ethylene carbonate, propylene carbonate, γ-butyrolactone, and γ-valerolactone or a solvent mixture composed of two or more organic solvents selected from the above-mentioned group is contained in a ratio of 60 vol % or more to the total solvent amount. The nonaqueous electrolytic solution containing this solvent mixture is low in evaporation and leak of the solvent even if the electrolytic solution is used at high temperature. In particular, the cycle characteristics and the high-temperature storage characteristics are generally well-balanced by using a combination in which the total amount of ethylene carbonate and γ-butyrolactone based on the nonaqueous solvent is 70 vol % or more, preferably 80 vol % or more, and more preferably 90 vol % or more and the volume ratio of the ethylene carbonate and the γ-butyrolactone is 5:95 to 45:55 or a combination in which the total amount of ethylene carbonate and propylene carbonate based on the nonaqueous solvent is 70 vol % or more, preferably 80 vol % or more, and more preferably 90 vol % or more and the volume ratio of the ethylene carbonate and the propylene carbonate is 30:70 to 60:40.

In this description, the volume of a nonaqueous solvent is a measured value at 25° C., but in those, such as ethylene carbonate, that are a solid at 25° C., the measured value at the melting point is used.

{Compound Represented by Formula (1)}

The nonaqueous electrolytic solution according to the first or second aspect of the present invention contains the above-described electrolyte and a nonaqueous solvent and is characterized in that the nonaqueous solvent contains a compound (hereinafter, occasionally referred to as "Compound (1)") represented by the following Formula (1).

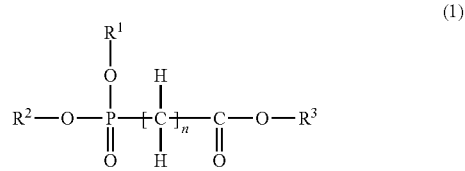

In Formula (1), $R^1$ to $R^3$ each independently represent an alkyl group of 1 to 12 carbon atoms, which may be substituted by a halogen atom; and n represents an integer of 0 to 6.

In Formula (1) above, examples of the alkyl group of 1 to 12 carbon atoms of $R^1$ to $R^3$ include linear, branched, or cyclic alkyl groups, such as a methyl group, an ethyl group, a n-propyl group, an i-propyl group, a n-butyl group, an i-butyl group, a sec-butyl group, a tert-butyl group, a pentyl group, a cyclopentyl group, and a cyclohexyl group. The lower limit of the number of carbon atoms of each of $R^1$ to $R^3$ is one or more and preferably two or more, and the upper limit is 12 or less, preferably eight or less, and more preferably four or less.

Furthermore, the alkyl group may be substituted by a halogen atom such as a fluorine atom. Examples of the group substituted by a fluorine atom include partially fluorinated alkyl groups of the above-mentioned alkyl groups and perfluoroalkyl groups, such as a trifluoromethyl group, a trifluoroethyl group, and a pentafluoroethyl group.

Compounds (1) are exemplified below.

<Compound of n=0>

Trimethyl phosphonoformate, methyl diethyl phosphonoformate, methyl dipropyl phosphonoformate, methyl dibutyl phosphonoformate, triethyl phosphonoformate, ethyl dimethyl phosphonoformate, ethyl dipropyl phosphonoformate, ethyl dibutyl phosphonoformate, tripropyl phosphonoformate, propyl dimethyl phosphonoformate, propyl diethyl phosphonoformate, propyl dibutyl phosphonoformate, tributyl phosphonoformate, butyl dimethyl phosphonoformate, butyl diethyl phosphonoformate, butyl dipropyl phosphonoformate, methyl bis(2,2,2-trifluoroethyl)phosphonoformate, ethyl bis(2,2,2-trifluoroethyl)phosphonoformate, propyl bis(2,2,2-trifluoroethyl)phosphonoformate, butyl bis(2,2,2-trifluoroethyl)phosphonoformate, and so on.

<Compound of n=1>

Trimethyl phosphonoacetate, methyl diethyl phosphonoacetate, methyl dipropyl phosphonoacetate, methyl dibutyl phosphonoacetate, triethyl phosphonoacetate, ethyl dimethyl phosphonoacetate, ethyl dipropyl phosphonoacetate, ethyl dibutyl phosphonoacetate, tripropyl phosphonoacetate, propyl dimethyl phosphonoacetate, propyl diethyl phosphonoacetate, propyl dibutyl phosphonoacetate, tributyl phosphonoacetate, butyl dimethyl phosphonoacetate, butyl diethyl phosphonoacetate, butyl dipropyl phosphonoacetate, methyl bis(2,2,2-trifluoroethyl)phosphonoacetate, ethyl bis(2,2,2-trifluoroethyl)phosphonoacetate, propyl bis(2,2,2-trifluoroethyl)phosphonoacetate, butyl bis(2,2,2-trifluoroethyl) phosphonoacetate, and so on.

<Compound of n=2>

Trimethyl-3-phosphonopropionate, methyl diethyl-3-phosphonopropionate, methyl dipropyl-3-phosphonopropionate, methyl dibutyl 3-phosphonopropionate, triethyl-3-phosphonopropionate, ethyl dimethyl-3-phosphonopropionate, ethyl dipropyl-3-phosphonopropionate, ethyl dibutyl 3-phosphonopropionate, tripropyl-3-phosphonopropionate, propyl dimethyl-3-phosphonopropionate, propyl diethyl-3-phosphonopropionate, propyl dibutyl 3-phosphonopropionate, tributyl-3-phosphonopropionate, butyl dimethyl-3-phosphonopropionate, butyl diethyl-3-phosphonopropionate, butyl dipropyl-3-phosphonopropionate, methyl bis(2,2,2-trifluoroethyl)-3-phosphonopropionate, ethyl bis(2,2,2-trifluoroethyl)-3-phosphonopropionate, propyl bis(2,2,2-trifluoroethyl)-3-phosphonopropionate, butyl bis(2,2,2-trifluoroethyl)-3-phosphonopropionate, and so on.

<Compound of n=3>

Trimethyl-4-phosphonobutyrate, methyl diethyl-4-phosphonobutyrate, methyl dipropyl-4-phosphonobutyrate, methyl dibutyl 4-phosphonobutyrate, triethyl-4-phosphonobutyrate, ethyl dimethyl-4-phosphonobutyrate, ethyl dipropyl-4-phosphonobutyrate, ethyl dibutyl 4-phosphonobutyrate, tripropyl-4-phosphonobutyrate, propyl dimethyl-4-phosphonobutyrate, propyl diethyl-4-phosphonobutyrate, propyl dibutyl 4-phosphonobutyrate, tributyl-4-phosphonobutyrate, butyl dimethyl-4-phosphonobutyrate, butyl diethyl-4-phosphonobutyrate, butyl dipropyl-4-phosphonobutyrate, and so on.

Among them, from the viewpoint of enhancement of battery characteristics after high-temperature storage, compounds of n=0, 1, or 2 are preferred, and compounds of n=1 or 2 are particularly preferred.

Compounds (1) may be used alone or in a combination of two or more.

In the first aspect of the present invention, the nonaqueous electrolytic solution does not contain at least one compound selected from the group consisting of cyclic carbonate compounds having carbon-carbon unsaturated bonds, cyclic carbonate compounds having fluorine atoms, monofluorophosphates, and difluorophosphates, which are described below. The ratio of Compound (1) (when two or more Compounds (1) are used, the ratio of the sum of them) in the nonaqueous electrolytic solution of the first aspect of the invention is usually 0.001 vol % or more, preferably 0.05 vol % or more, more preferably 0.1 vol % or more, and most preferably 0.2 vol % or more. In a lower concentration than the above, the effect of the present invention may be hardly exhibited. On the other hand, if the concentration of Compound (1) is too high, the storage characteristics of the battery may be deteriorated. Therefore, the upper limit is usually less than 1 vol %, preferably 0.8 vol % or less, and more preferably 0.7 vol % or less.

The nonaqueous electrolytic solution of the second aspect of the present invention contains, in addition to Compound (1), at least one compound selected from the group consisting of cyclic carbonate compounds having carbon-carbon unsaturated bonds, cyclic carbonate compounds having fluorine atoms, monofluorophosphates, and difluorophosphates. In this case, the ratio of Compound (1) in the nonaqueous solvent is usually 0.001 vol % or more, preferably 0.05 vol % or more, more preferably 0.1 vol % or more, and most preferably 0.2 vol % or more. In a lower concentration than the above, the effect of the present invention may be hardly exhibited. On the other hand, if the concentration of Compound (1) is too high, the storage characteristics of the battery may be deteriorated. Therefore, the upper limit is usually less than 5 vol %, preferably 3 vol % or less, more preferably 2 vol % or less, more preferably 1 vol % or less, and most preferably 0.8 vol % or less.

When the nonaqueous electrolytic solution of the first or second aspect of the present invention is used, the amount of gas generated in a nonaqueous electrolyte secondary battery is small, and the storage characteristics are excellent, though the reasons thereof are not clear. In addition, though the present invention is not limited to the following action principle, it is thought that Compound (1) partially reacts with the positive electrode in a charged state to form a film, and this film suppresses side reaction between another electrolytic solution component and an electrode active material even under a high-temperature atmosphere, as a result, the side reaction occurring in the inside of the battery during high-temperature storage is suppressed, gas generation is suppressed, and the storage characteristics can be enhanced.

However, Compound (1) tends to be reductively decomposed on the negative electrode side. Therefore, the side reaction on the negative electrode side increases with the amount of Compound (1), and the battery characteristics may be deteriorated. It is thought that when Compound (1) is used together with at least one compound selected from the group consisting of cyclic carbonate compounds having carbon-carbon unsaturated bonds, cyclic carbonate compounds having fluorine atoms, monofluorophosphates, and difluorophosphates, excessive reaction of Compound (1) on the negative electrode side can be suppressed by a film, formed on the negative electrode, by the at least one compound selected from the group consisting of cyclic carbonate compounds having carbon-carbon unsaturated bonds, cyclic carbonate compounds having fluorine atoms, monofluorophosphates, and difluorophosphates.

{Compound Represented by Formula (2)/Compound Represented by Formula (3)}

The nonaqueous electrolytic solution of the third aspect of the present invention is characterized in that the nonaqueous electrolytic solution contains, in addition to the above-described electrolyte and nonaqueous solvent, a compound (hereinafter, occasionally referred to as "Compound (2)") represented by the following Formula (2) and/or a compound (hereinafter, occasionally referred to as "Compound (3)") represented by the following Formula (3).

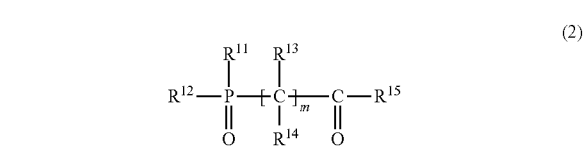

In Formula (2), $R^{11}$ to $R^{14}$ each independently represent a hydrogen atom, a halogen atom, or a monovalent substituent of 1 to 12 carbon atoms; $R^{15}$ represents an alkyl group of 1 to 12 carbon atoms, which may be substituted by a halogen atom, an alkenyl group of 2 to 12 carbon atoms, which may be substituted by a halogen atom, an aryl group of 6 to 12 carbon atoms, which may be substituted by a halogen atom, or an aralkyl group of 7 to 12 carbon atoms, which may be substituted by a fluorine atom; and m represents an integer of 0 to 6.

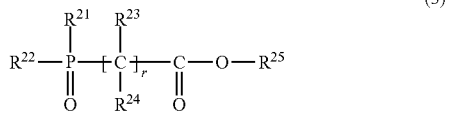
(3)

In Formula (3), $R^{21}$ to $R^{24}$ each independently represent a hydrogen atom, a halogen atom, or a monovalent substituent of 1 to 12 carbon atoms; $R^{25}$ represents an alkyl group of 1 to 12 carbon atoms, which may be substituted by a halogen atom, an alkenyl group of 2 to 12 carbon atoms, which may be substituted by a halogen atom, an aryl group of 6 to 12 carbon atoms, which may be substituted by a halogen atom, or an aralkyl group of 7 to 12 carbon atoms, which may be substituted by a halogen atom; and r represents an integer of 0 to 6, wherein when both $R^{21}$ and $R^{22}$ are alkoxy groups, r represents an integer of 1 to 6, and at least one of $R^{23}$ and $R^{24}$ represent a group other than a hydrogen atom.

In Formula (2) above, the monovalent substituent of 1 to 12 carbon atoms in $R^{11}$ to $R^{14}$ is not particularly limited as long as the effect of the present invention is not impaired, and examples thereof include an alkyl group, an alkenyl group, an aryl group, an aralkyl group, an alkoxyalkyl group, and groups represented by $R^a$—O— ($R^a$ represents an alkyl group, an alkenyl group, an aryl group, an aralkyl group, or an alkoxyalkyl group, and hereinafter, occasionally referred to as "$R^a$O group").

In these monovalent substituent of 1 to 12 carbon atoms, a part of or all of the hydrogen atoms may be substituted by halogen atoms such as fluorine atoms. Among these monovalent substituents of 1 to 12 carbon atoms, the alkyl group and $R^a$O group are preferred.

In $R^a$O group in which $R^a$ is an alkyl group, the alkyl group as $R^a$ is preferably an alkyl group of 1 to 6 carbon atoms. Examples of the preferred alkyl group as $R^a$ include a methyl group, an ethyl group, a n-propyl group, and an i-propyl group. In particular, the methyl group and the ethyl group are preferred. In $R^a$O group in which $R^a$ is an aryl group, the aryl group as $R^a$ is preferably a phenyl group or a tolyl group, and the phenyl group is preferred.

In Formula (2), examples of the alkyl group of 1 to 12 carbon atoms as $R^{15}$ include a methyl group, an ethyl group, a n-propyl group, an i-propyl group, a n-butyl group, an i-butyl group, a sec-butyl group, a tert-butyl group, a pentyl group, a cyclopentyl group, and a cyclohexyl group. Preferable examples are chain (which may be linear or branched) or cyclic alkyl groups having preferably 1 to 6 carbon atoms and more preferably 1 to 4 carbon atoms, and chain alkyl groups are preferred.

Examples of the alkenyl group of 2 to 12 carbon atoms as $R^{15}$ include a vinyl group and an allyl group, and those of 2 to 8 carbon atoms are preferred, and those of 2 to 4 carbon atoms are particularly preferred.

Examples of the aryl group of 6 to 12 carbon atoms as $R^{15}$ include a phenyl group, a tolyl group, and a xylyl group. Among them, the phenyl group is preferred.

Examples of the aralkyl group of 7 to 12 carbon atoms as $R^{15}$ include a benzyl group and a phenethyl group. Among them, the benzyl group is preferred.

In addition, the above-mentioned alkyl group, alkenyl group, aryl group, and aralkyl group may be substituted by halogen atoms such as fluorine atoms, and examples of fluorinated groups include fluorinated alkyl groups such as a trifluoromethyl group, a trifluoroethyl group, and a pentafluoroethyl group; fluorinated alkenyl groups such as a 2-fluorovinyl group and a 3-fluoro-2-propenyl group; fluorinated aryl groups such as a 2-fluorophenyl group, a 3-fluorophenyl group, a 4-fluorophenyl group, a 2,4-difluorophenyl group, and a 3,5-difluorophenyl group; and fluorinated aralkyl groups such as a 2-fluorobenzyl group, a 3-fluorobenzyl group, a 4-fluorobenzyl group, a 2,4-difluorobenzyl group, and a 3,5-difluorobenzyl group.

m is an integer of 0 to 6, in particular, compounds of m=0 to 3 are preferred, and compounds of m=0 to 2 are more preferred, and compounds of m=0 or 1 are most preferred.

Compounds represented by Formula (2) are exemplified below.

<Examples of Compound of m=0>

Dimethyl acetylphosphonate, diethyl acetylphosphonate, dipropyl acetylphosphonate, bis(trifluoromethyl)acetylphosphonate, bis(2,2,2-trifluoroethyl)acetylphosphonate, bis(pentafluoroethyl)acetylphosphonate, dially acetylphosphonate, diphenyl acetylphosphonate, dimethyl(trifluoroacetyl) phosphonate, diethyl(trifluoroacetyl)phosphonate, dipropyl (trifluoroacetyl)phosphonate, dimethyl(1-oxopropyl) phosphonate, diethyl(1-oxopropyl)phosphonate, dipropyl(1-oxopropyl)phosphonate, bis(trifluoromethyl)(1-oxopropyl) phosphonate, bis(2,2,2-trifluoroethyl)(1-oxopropyl) phosphonate, bis(pentafluoroethyl)(1-oxopropyl) phosphonate, diallyl(1-oxopropyl)phosphonate, diphenyl(1-oxopropyl)phosphonate, dimethyl(1-oxo-2-propenyl) phosphonate, diethyl(1-oxo-2-propenyl)phosphonate, dipropyl(1-oxo-2-propenyl)phosphonate, dimethyl(1-oxobutyl)phosphonate, diethyl(1-oxobutyl)phosphonate, dipropyl(1-oxobutyl)phosphonate, dimethyl(2-methyl-1-oxopropyl)phosphonate, diethyl(2-methyl-1-oxopropyl) phosphonate, dipropyl(2-methyl-1-oxopropyl)phosphonate, dimethyl(1-oxo-3-butenyl)phosphonate, diethyl(1-oxo-3-butenyl)phosphonate, dipropyl(1-oxo-3-butenyl)phosphonate, dimethyl(1-oxo-2-methoxyethyl)phosphonate, diethyl (1-oxo-2-methoxyethyl)phosphonate, dimethyl benzoylphosphonate, diethyl benzoylphosphonate, methyl acetyl methylphosphinate, methyl ethyl acetylphosphinate, methyl acetyl fluorophosphinate, methyl methyl(1-oxopropyl)phosphinate, methyl ethyl(1-oxopropyl)phosphinate, acetyl dimethylphosphine oxide, acetyl diethylphosphine oxide, acetyl difluorophosphine oxide, and so on.

<Examples of Compound of m=1>

Dimethyl(2-oxopropyl)phosphonate, diethyl(2-oxopropyl)phosphonate, dipropyl(2-oxopropyl)phosphonate, bis (trifluoromethyl)(2-oxopropyl)phosphonate, bis(2,2,2-trifluoroethyl)(2-oxopropyl)phosphonate, bis(pentafluoroethyl) (2-oxopropyl)phosphonate, diallyl(2-oxopropyl) phosphonate, diphenyl(2-oxopropyl)phosphonate, dimethyl (2-oxobutyl)phosphonate, diethyl(2-oxobutyl)phosphonate, dipropyl(2-oxobutyl)phosphonate, dimethyl(1-methyl-2-oxopropyl)phosphonate, diethyl(1-methyl-2-oxopropyl) phosphonate, dimethyl(1-methoxy-2-oxopropyl)phosphonate, diethyl(1-methoxy-2-oxopropyl)phosphonate, dimethyl(1-fluoro-2-oxopropyl)phosphonate, diethyl(1-fluoro-2-oxopropyl)phosphonate, methyl methyl(2-oxopropyl)phosphinate, methyl ethyl(2-oxopropyl)phosphinate, methyl fluoro(2-oxopropyl)phosphinate, dimethyl(2-oxopropyl)phosphine oxide, diethyl(2-oxopropyl)phosphine oxide, difluoro(2-oxopropyl)phosphine oxide, and so on.

<Examples of Compound of m=2>

Dimethyl(3-oxobutyl)phosphonate, diethyl(3-oxobutyl) phosphonate, dipropyl(3-oxobutyl)phosphonate, bis(trifluoromethyl)(3-oxobutyl)phosphonate, bis(2,2,2-trifluoroethyl) (3-oxobutyl)phosphonate, bis(pentafluoroethyl)(3-oxobutyl) phosphonate, diallyl(3-oxobutyl)phosphonate, diphenyl(3-oxobutyl)phosphonate, and so on.

<Compound of m=3>

Dimethyl(4-oxopentyl)phosphonate, diethyl(4-oxopentyl) phosphonate, dipropyl(4-oxopentyl)phosphonate, and so on.

Among them, from the viewpoints of enhancement of battery characteristics after high-temperature storage and a cycle test, compounds of m=0, 1, or 2 are preferred, compounds of m=0 or 1 are more preferred, and the following compounds are particularly preferred.

<Preferred Examples of Compound of m=0>

Dimethyl acetylphosphonate, diethyl acetylphosphonate, dipropyl acetylphosphonate, bis(trifluoromethyl)acetylphosphonate, bis(2,2,2-trifluoroethyl)acetylphosphonate, bis(pentafluoroethyl)acetylphosphonate, dimethyl(trifluoroacetyl)phosphonate, diethyl(trifluoroacetyl)phosphonate, dipropyl(trifluoroacetyl)phosphonate, dimethyl(1-oxopropyl)phosphonate, diethyl(1-oxopropyl)phosphonate, dipropyl(1-oxopropyl)phosphonate, bis(trifluoromethyl)(1-oxopropyl)phosphonate, bis(2,2,2-trifluoroethyl)(1-oxopropyl)phosphonate, bis(pentafluoroethyl)(1-oxopropyl)phosphonate, dimethyl(1-oxobutyl)phosphonate, diethyl(1-oxobutyl)phosphonate, dipropyl(1-oxobutyl)phosphonate, dimethyl(2-methyl-1-oxopropyl)phosphonate, diethyl(2-methyl-1-oxopropyl)phosphonate, dipropyl(2-methyl-1-oxopropyl)phosphonate, and so on.

<Preferred Examples of Compound of m=1>

Dimethyl(2-oxopropyl)phosphonate, diethyl(2-oxopropyl)phosphonate, dipropyl(2-oxopropyl)phosphonate, bis(trifluoromethyl)(2-oxopropyl)phosphonate, bis(2,2,2-trifluoroethyl)(2-oxopropyl)phosphonate, bis(pentafluoroethyl)(2-oxopropyl)phosphonate, dimethyl(2-oxobutyl) phosphonate, diethyl(2-oxobutyl)phosphonate, dipropyl(2-oxobutyl)phosphonate, and so on.

The compounds represented by Formula (2) may be used alone or in a combination of two or more.

In Formula (3) above, the monovalent substituent of 1 to 12 carbon atoms in $R^{21}$ to $R^{24}$ is not particularly limited as long as the effect of the present invention is not impaired, and examples thereof include an alkyl group, an alkenyl group, an aryl group, an aralkyl group, an alkoxyalkyl group, and groups represented by $R^b$—O— ($R^b$ represents an alkyl group, an alkenyl group, an aryl group, an aralkyl group, or an alkoxyalkyl group, and hereinafter, occasionally referred to as "$R^bO$ group").

In these monovalent substituent of 1 to 12 carbon atoms, a part of or all of the hydrogen atoms may be substituted by halogen atoms such as fluorine atoms.

Among these monovalent substituents of 1 to 12 carbon atoms, from the viewpoint of enhancement of battery characteristics, $R^{21}$ and $R^{22}$ are preferably groups that are selected from alkyl groups, alkenyl groups, aryl groups, and $R^bO$ groups and more preferably substituents that are selected from alkyl groups, alkenyl groups, and $R^bO$ groups.

In addition, $R^{23}$ and $R^{24}$ are preferably groups that are selected from alkyl groups, alkenyl groups, aryl groups, and $R^bO$ groups and more preferably substituents that are selected from alkyl groups, alkenyl groups, and $R^bO$ groups.

In Formula (3), examples of the alkyl group of 1 to 12 carbon atoms as $R^{25}$ include a methyl group, an ethyl group, a n-propyl group, an i-propyl group, a n-butyl group, an i-butyl group, a sec-butyl group, a tert-butyl group, a pentyl group, a cyclopentyl group, and a cyclohexyl group. Preferable examples are chain (which may be linear or branched) or cyclic alkyl groups having preferably 1 to 6 carbon atoms and more preferably 1 to 4 carbon atoms, and chain alkyl groups are preferred.

Examples of the alkenyl group of 2 to 12 carbon atoms as $R^{25}$ include a vinyl group and an allyl group, and those of 2 to 8 carbon atoms are preferred, and those of 2 to 4 carbon atoms are particularly preferred.

Examples of the aryl group of 6 to 12 carbon atoms as $R^{25}$ include a phenyl group, a tolyl group, and a xylyl group. Among them, the phenyl group is preferred.

Examples of the aralkyl group of 7 to 12 carbon atoms as $R^{25}$ include a benzyl group and a phenethyl group. Among them, the benzyl group is preferred.

In addition, the above-mentioned alkyl group, alkenyl group, aryl group, and aralkyl group may be substituted by halogen atoms such as fluorine atoms, and examples of fluorinated groups include fluorinated alkyl groups such as a trifluoromethyl group, a trifluoroethyl group, and a pentafluoroethyl group; fluorinated alkenyl groups such as a 2-fluorovinyl group and a 3-fluoro-2-propenyl group; fluorinated aryl groups such as a 2-fluorophenyl group, a 3-fluorophenyl group, a 4-fluorophenyl group, a 2,4-difluorophenyl group, and a 3,5-difluorophenyl group; and fluorinated aralkyl groups such as a 2-fluorobenzyl group, a 3-fluorobenzyl group, a 4-fluorobenzyl group, a 2,4-difluorobenzyl group, and a 3,5-difluorobenzyl group.

r is an integer of 0 to 6, in particular, compounds of r=0 to 3 are preferred, and compounds of r=0 to 2 are more preferred, and compounds of r=0 or 1 are most preferred.

In addition, in Formula (3), when both $R^{21}$ and $R^{22}$ are alkoxy groups, r represents an integer of 1 to 6, and at least one of $R^{23}$ and $R^{24}$ is other than a hydrogen atom. Compounds in which both $R^{21}$ and $R^{22}$ are alkoxy groups and r=0 tend to be reductively decomposed on the negative electrode side, and, therefore, the battery characteristics may be insufficient compared to the case of compounds in which r represents an integer of 1 to 6 and at least one of $R^{23}$ and $R^{24}$ is other than a hydrogen atom. Furthermore, it is assumed that even if r represents an integer of 1 or higher, when both $R^{23}$ and $R^{24}$ are hydrogen atoms, elimination reaction of hydrogen tends to occur during reductive decomposition on the negative electrode side. Therefore, the battery characteristics may be insufficient compared to the case of compounds in which at least one of $R^{23}$ and $R^{24}$ is other than a hydrogen atom.

Compounds represented by Formula (3) are exemplified below.

<Compound of r=0>

Methyl(dimethylphosphinyl)formate, methyl(diethylphosphinyl)formate, methyl(dipropylphosphinyl)formate, methyl [bis(trifluoromethyl)phosphinyl]formate, methyl[bis(2,2,2-trifluoroethyl)phosphinyl]formate, ethyl(dimethylphosphinyl)formate, ethyl(diethylphosphinyl)formate, ethyl(dipropylphosphinyl)formate, ethyl[bis(trifluoromethyl)phosphinyl]formate, ethyl[bis(2,2,2-trifluoroethyl)phosphinyl]formate, methyl(difluorophosphinyl)formate, ethyl(difluorophosphinyl)formate, methyl(methoxymethylphosphinyl)formate, methyl(ethoxyethylphosphinyl)formate, ethyl(methoxymethylphosphinyl)formate, ethyl (ethoxyethylphosphinyl)formate, methyl (methoxyfluorophosphinyl)formate, ethyl (ethoxyfluorophosphinyl)formate, and so on.

<Compound of r=1>

Methyl(dimethylphosphinyl)acetate, methyl(diethylphosphinyl)acetate, methyl(dipropylphosphinyl)acetate, methyl [bis(trifluoromethyl)phosphinyl]acetate, methyl[bis(2,2,2-trifluoroethyl)phosphinyl]acetate, ethyl (dimethylphosphinyl)acetate, ethyl(diethylphosphinyl)

acetate, ethyl(dipropylphosphinyl)acetate, ethyl[bis(trifluoromethyl)phosphinyl]acetate, ethyl[bis(2,2,2-trifluoroethyl)phosphinyl]acetate, methyl(dimethylphosphinyl)fluoroacetate, methyl(diethylphosphinyl)fluoroacetate, ethyl(dimethylphosphinyl)fluoroacetate, ethyl(diethylphosphinyl)fluoroacetate, methyl-2-(dimethylphosphinyl)propionate, methyl-2-(diethylphosphinyl)propionate, ethyl-2-(dimethylphosphinyl)propionate, ethyl-2-(diethylphosphinyl)propionate, methyl-2-(dimethylphosphinyl)butyrate, methyl-2-(diethylphosphinyl)butyrate, ethyl-2-(dimethylphosphinyl)butyrate, ethyl-2-(diethylphosphinyl)butyrate, methyl(difluorophosphinyl)acetate, ethyl(difluorophosphinyl)acetate, methyl(methoxymethylphosphinyl)acetate, methyl(ethoxyethylphosphinyl)acetate, ethyl(methoxymethylphosphinyl)acetate, ethyl(ethoxyethylphosphinyl)acetate, methyl(methoxyfluorophosphinyl)acetate, ethyl(ethoxyfluorophosphinyl)acetate, trimethyl phosphonofluoroacetate, methyl(diethylphosphono)fluoroacetate, triethyl phosphonofluoroacetate, trimethyl-2-phosphonopropionate, methyl-2-diethylphosphonopropionate, triethyl-2-phosphonopropionate, ethyl-2-dimethyl phosphonopropionate, methyl-2-[bis(2,2,2-trifluoroethyl)phosphono]propionate, ethyl-2-[bis(2,2,2-trifluoroethyl)phosphono]propionate, trimethyl-2-phosphonobutyrate, methyl-2-diethyl phosphonobutyrate, triethyl-2-phosphonobutyrate, ethyl-2-dimethyl phosphonobutyrate, and so on.

<Compound of r=2>

Methyl-3-(dimethylphosphinyl)propionate, methyl-3-(diethylphosphinyl)propionate, ethyl-3-(dimethylphosphinyl)propionate, ethyl-3-(diethylphosphinyl)propionate, methyl-3-(dimethylphosphinyl)butyrate, methyl-3-(diethylphosphinyl)butyrate, ethyl-3-(dimethylphosphinyl)butyrate, ethyl-3-(diethylphosphinyl)butyrate, methyl-3-(methoxymethylphosphinyl)propionate, methyl-3-(ethoxyethylphosphinyl)propionate, ethyl-3-(methoxymethylphosphinyl)propionate, ethyl-3-(ethoxyethylphosphinyl)propionate, and so on.

Among them, from the viewpoints of enhancement of battery characteristics after high-temperature storage and a cycle test, compounds of r=0 or 1 are particularly preferred, and, above all, the following compounds are preferred.

<Preferred Examples of Compound of r=0>

Methyl(dimethylphosphinyl)formate, methyl(diethylphosphinyl)formate, ethyl(dimethylphosphinyl)formate, ethyl (diethylphosphinyl)formate, methyl(difluorophosphinyl)formate, ethyl(difluorophosphinyl)formate, methyl(methoxymethylphosphinyl)formate, methyl(ethoxyethylphosphinyl)formate, ethyl(methoxymethylphosphinyl)formate, ethyl(ethoxyethylphosphinyl)formate, methyl(methoxyfluorophosphinyl)formate, ethyl(ethoxyfluorophosphinyl)formate, and so on.

<Preferred Examples of Compound of r=1>

Methyl(dimethylphosphinyl)acetate, methyl(diethylphosphinyl)acetate, ethyl(dimethylphosphinyl)acetate, ethyl(diethylphosphinyl)acetate, methyl(dimethylphosphinyl)fluoroacetate, methyl(diethylphosphinyl)fluoroacetate, ethyl(dimethylphosphinyl)fluoroacetate, ethyl(diethylphosphinyl)fluoroacetate, methyl-2-(dimethylphosphinyl)propionate, methyl-2-(diethylphosphinyl)propionate, ethyl-2-(dimethylphosphinyl)propionate, ethyl-2-(diethylphosphinyl)propionate, methyl-2-(dimethylphosphinyl)butyrate, methyl-2-(diethylphosphinyl)butyrate, ethyl-2-(dimethylphosphinyl)butyrate, ethyl-2-(diethylphosphinyl)butyrate, methyl(difluorophosphinyl)acetate, ethyl(difluorophosphinyl)acetate, methyl(methoxymethylphosphinyl)acetate, methyl(ethoxyethylphosphinyl)acetate, ethyl(methoxymethylphosphinyl)acetate, ethyl(ethoxyethylphosphinyl)acetate, methyl(methoxyflucrophosphinyl)acetate, ethyl(ethoxyfluorophosphinyl)acetate, trimethyl phosphonofluoroacetate, methyl(diethylphosphono)fluoroacetate, triethyl phosphonofluoroacetate, trimethyl-2-phosphonopropionate, methyl-2-diethylphosphonopropionate, triethyl-2-phosphonopropionate, ethyl-2-dimethyl phosphonopropionate, trimethyl-2-phosphonobutyrate, methyl-2-diethyl phosphonobutyrate, triethyl-2-phosphonobutyrate, ethyl-2-dimethyl phosphonobutyrate, and so on.

The compounds represented by Formula (3) may be used alone or in a combination of two or more.

The ratio of the compound represented by Compound (2) and/or Compound (3) in the nonaqueous electrolytic solution of the third aspect of the present invention (when two or more compounds are used, the ratio of the sum of them) is usually 0.001 wt % or more, preferably 0.01 wt % or more, more preferably 0.05 wt % or more, and most preferably 0.1 wt % or more. In a lower concentration than the above, the effect of the present invention may be hardly exhibited. On the other hand, if the concentration is too high, the capacity of the battery may be decreased. Therefore, the upper limit is usually 10 wt % or less, preferably 4 wt % or less, more preferably 2 wt % or less, more preferably 1 wt % or less, and most preferably 0.8 wt % or less.

When the nonaqueous electrolytic solution containing Compound (2) and/or Compound (3) according to the present invention is used, the amount of gas generated in a nonaqueous electrolyte secondary battery is small, and the storage characteristics are excellent, though the reasons thereof are not clear. In addition, though the present invention is not limited to the following action principle, it is thought that Compound (3) partially reacts with the positive electrode in a charged state or coordinates on the surface of the positive electrode to suppress side reaction between another electrolytic solution component and an electrode active material, as a result, the side reaction occurring in the inside of the battery during high-temperature storage and degradation of the positive electrode are suppressed, resulting in suppression of gas generation and enhancement of storage characteristics. Furthermore, it is thought that in a compound having a substituent other than hydrogen on the α-position of carbonyl, the gas generation is further suppressed by suppressing the elimination reaction of hydrogen in reductive decomposition on the negative electrode side.

In addition, it is thought that Compound (2) partially reacts with the positive electrode in a charged state to form a film, and this film suppresses side reaction between another electrolytic solution component and an electrode active material even under a high-temperature atmosphere, as a result, the side reaction occurring in the inside of the battery during high-temperature storage and degradation of the positive electrode are suppressed, resulting in suppression of gas generation and enhancement of storage characteristics. It is thought that, in particular, since Compound (2) has a PO bond and a CO bond, the ability of protecting the surface of the positive electrode (by coordination or formation of a protection film) is high, compared to the case of phosphinic ester, and therefore the side reaction between the positive electrode and the electrolytic solution is suppressed, and a battery that is low in gas generation and excellent in battery characteristics can be provided.

{Other Compounds}

The nonaqueous electrolytic solution according to the first to third aspect of the present invention may contain a cyclic carbonate compound having a carbon-carbon unsaturated bond, a cyclic carbonate compound having a fluorine atom, a monofluorophosphate, a difluorophosphate, or other various compounds, such as a conventionally known overcharge protection agent, as auxiliaries.

<Cyclic Carbonate Compound Having Carbon-Carbon Unsaturated Bond>

The cyclic carbonate compound having a carbon-carbon unsaturated bond forms a stable protection film on the surface of a negative electrode and can thereby enhance the cycle characteristics of the battery.

Examples of the cyclic carbonate compound having a carbon-carbon unsaturated bond include vinylene carbonate compounds such as vinylene carbonate, methyl vinylene carbonate, ethyl vinylene carbonate, 4,5-dimethyl vinylene carbonate, 4,5-diethyl vinylene carbonate, fluorovinylene carbonate, and trifluoromethyl vinylene carbonate; vinyl ethylene carbonate compounds such as vinyl ethylene carbonate, 4-methyl-4-vinyl ethylene carbonate, 4-ethyl-4-vinyl ethylene carbonate, 4-n-propyl-4-vinyl ethylene carbonate, 5-methyl-4-vinyl ethylene carbonate, 4,4-divinyl ethylene carbonate, and 4,5-divinyl ethylene carbonate; and methylene ethylene carbonate compounds such as 4,4-dimethyl-5-methylene ethylene carbonate and 4,4-diethyl-5-methylene ethylene carbonate. Among them, vinylene carbonate, vinyl ethylene carbonate, 4-methyl-4-vinyl ethylene carbonate, and 4,5-divinyl ethylene carbonate are preferred from the viewpoint of enhancement of cycle characteristics. In particular, vinylene carbonate and vinyl ethylene carbonate are more preferred, and vinylene carbonate is most preferred.

These cyclic carbonate compounds having carbon-carbon unsaturated bonds may be used alone or in a combination of two or more. When a combination of two or more cyclic carbonate compounds having carbon-carbon unsaturated bonds is used, a combination of vinylene carbonate and vinyl ethylene carbonate is preferred.

When the nonaqueous electrolytic solution contains the cyclic carbonate compound having a carbon-carbon unsaturated bond, the ratio thereof in the nonaqueous electrolytic solution is usually 0.01 wt % or more, preferably 0.1 wt % or more, more preferably 0.3 wt % or more, and most preferably 0.5 wt % or more. When the amount of the cyclic carbonate compound having a carbon-carbon unsaturated bond is too low, the effect of enhancing the cycle characteristics of the battery may be insufficient. In addition, the cyclic carbonate compound having a carbon-carbon unsaturated bond readily reacts with a positive electrode material in a charged state. Therefore, when the electrolytic solution contains the cyclic carbonate compound having a carbon-carbon unsaturated bond, the amount of gas generated during high-temperature storage may be increased or the battery characteristics may be insufficient. However, the side reaction with the positive electrode material can be suppressed by simultaneously using Compound (1) or Compound (2) and/or Compound (3). This can achieve both enhancement of cycle characteristics and suppression of gas generation and is therefore particularly preferred. However, if the concentration of the cyclic carbonate compound having a carbon-carbon unsaturated bond is too high, the amount of gas generated during high-temperature storage may be increased, or the discharge characteristics at low temperature may be deteriorated. Therefore, the upper limit thereof is usually 8 wt % or less, preferably 4 wt % or less, and most preferably 3 wt % or less.

<Cyclic Carbonate Compound Having a Fluorine Atom>

The cyclic carbonate compound having a fluorine atom also forms a stable protection film on the surface of a negative electrode and can thereby enhance the cycle characteristics of the battery.

Examples of the cyclic carbonate compound having a fluorine atom include fluoroethylene carbonate (4-fluoro-1,3-dioxolan-2-one), 4,5-difluoro-1,3-dioxolan-2-one, 4,4-difluoro-1,3-dioxolan-2-one, 4,4,5-trifluoro-1,3-dioxolan-2-one, 4,4,5,5-tetrafluoro-1,3-dioxolan-2-one, 4-fluoro-5-methyl-1,3-dioxolan-2-one, 4-fluoro-4-methyl-1,3-dioxolan-2-one, 4,5-difluoro-4-methyl-1,3-dioxolan-2-one, 4,4,5-trifluoro-5-methyl-1,3-dioxolan-2-one, and trifluoromethyl-1,3-dioxolan-2-one. Among them, fluoroethylene carbonate, 4,5-difluoro-1,3-dioxolan-2-one, and 4-fluoro-5-methyl-1,3-dioxolan-2-one are preferred from the viewpoint of enhancement of the cycle characteristics.

These cyclic carbonate compounds having fluorine atoms may be used alone or in a combination of two or more.

When the nonaqueous electrolytic solution contains the cyclic carbonate compound having a fluorine atom, the ratio thereof in the nonaqueous electrolytic solution is usually 0.01 wt % or more, preferably 0.1 wt % or more, more preferably 0.3 wt % or more, and most preferably 0.5 wt % or more. When the amount of the cyclic carbonate compound having a fluorine atom is too low, the effect of enhancing the cycle characteristics of the battery may be insufficient. Furthermore, the cyclic carbonate compound having a fluorine atom contained in the electrolytic solution may lead to an increase in the amount of gas generated during high-temperature storage or insufficient battery characteristics. However, the simultaneous use of Compound (1) or Compound (2) and/or Compound (3) can achieve both the enhancement of the cycle characteristics and the suppression of the gas generation at the same time, and is therefore particularly preferred. However, when the amount of the cyclic carbonate compound having a fluorine atom is too high, the amount of gas generated during high-temperature storage may be increased or discharge characteristics at low temperature may be deteriorated. Therefore, the upper limit thereof is usually 20 wt % or less, preferably 5 wt % or less, and most preferably 3 wt % or less.

<Monofluorophosphate and Difluorophosphate>

The monofluorophosphate and the difluorophosphate also form stable protection film on the surface of a negative electrode and therefore can enhance the cycle characteristics of the battery.

Counter cations of the monofluorophosphate and the difluorophosphate are not particularly limited, and Examples thereof include lithium, sodium, potassium, magnesium, and calcium. Among them, lithium is preferred.

Examples of the monofluorophosphate and the difluorophosphate include lithium monofluorophosphate, sodium monofluorophosphate, potassium monofluorophosphate, lithium difluorophosphate, sodium difluorophosphate, and potassium difluorophosphate. Lithium monofluorophosphate and lithium difluorophosphate are preferred, and lithium difluorophosphate is more preferred.

These may be used alone or in a combination of two or more.

The monofluorophosphate and/or the difluorophosphate may be used together with a cyclic carbonate compound having a carbon-carbon unsaturated bond or a cyclic carbonate compound having a fluorine atom, and from the viewpoint of enhancement of the cycle characteristics, it is preferably used in combination with vinylene carbonate, vinyl ethylene carbonate, or fluoroethylene carbonate.

When the nonaqueous electrolytic solution contains the monofluorophosphate and/or the difluorophosphate, the ratio thereof in the nonaqueous electrolytic solution is usually 0.001 wt % or more, preferably 0.01 wt % or more, more preferably 0.1 wt % or more, and most preferably 0.2 wt % or more. When the amount of the monofluorophosphate and/or the difluorophosphate is too small, the effect of enhancing the cycle characteristics of a battery may be insufficient. The upper limit is usually 5 wt % or less, preferably 3 wt % or less, and more preferably 2 wt % or less.

Furthermore, when the nonaqueous electrolytic solution contains both the cyclic carbonate compound having a carbon-carbon unsaturated bond and the cyclic carbonate compound having a fluorine atom, the total amount thereof is usually 0.01 wt % or more, preferably 0.1 wt % or more, more preferably 0.3 wt % or more, and most preferably 0.5 wt % or more and usually 20 wt % or less, preferably 10 wt % or less, more preferably 5 wt % or less, and most preferably 3 wt % or less, because of the same reasons as for the upper limit and the lower limit of the content of each compound.

In addition, when the nonaqueous electrolytic solution contains the cyclic carbonate compound having a carbon-carbon unsaturated bond and/or the cyclic carbonate compound having a fluorine atom and the monofluorophosphate and/or the difluorophosphate, the total amount thereof is usually 0.01 wt % or more, preferably 0.1 wt % or more, more preferably 0.3 wt % or more, and most preferably 0.5 wt % or more and usually 20 wt % or less, preferably 10 wt % or less, more preferably 5 wt % or less, and most preferably 3 wt % or less, because of the same reasons as for the upper limit and the lower limit of the content of each compound.

<Overcharge Protection Agent>

Examples of the overcharge protection agent include aromatic compounds such as biphenyl, alkyl biphenyls, e.g., 2-methyl-biphenyl, terphenyls, partially hydrogenated terphenyls, cyclopentylbenzene, cyclohexylbenzene, cis-1-propyl-4-phenylcyclohexane, trans-1-propyl-4-phenylcyclohexane, cis-1-butyl-4-phenylcyclohexane, trans-1-butyl-4-phenylcyclohexane, t-butylbenzene, t-amylbenzene, diphenyl ethers, and dibenzofuran; partially fluorinated compounds of the above-mentioned aromatic compounds such as 2-fluorobiphenyl, 3-fluorobiphenyl, 4-fluorobiphenyl, 4,4'-difluorobiphenyl, o-cyclohexylfluorobenzene, and p-cyclohexylfluorobenzene; and fluorine-containing anisole compounds such as 2,4-difluoroanisole, 2,5-difluoroanisole, 2,6-difluoroanisole, and 3,5-difluoroanisole.

Among them, aromatic compounds such as biphenyl, alkyl biphenyls, e.g., 2-methyl-biphenyl, terphenyls, partially hydrogenated terphenyls, cyclopentylbenzene, cyclohexylbenzene, cis-1-propyl-4-phenylcyclohexane, trans-1-propyl-4-phenylcyclohexane, cis-1-butyl-4-phenylcyclohexane, trans-1-butyl-4-phenylcyclohexane, t-butylbenzene, t-amylbenzene, diphenyl ethers, and dibenzofuran; and partially fluorinated compounds of the above-mentioned aromatic compounds such as 2-fluorobiphenyl, 3-fluorobiphenyl, 4-fluorobiphenyl, 4,4'-difluorobiphenyl, o-cyclohexylfluorobenzene, and p-cyclohexylfluorobenzene are preferred. Partially hydrogenated terphenyls, cyclopentylbenzene, cyclohexylbenzene, cis-1-propyl-4-phenylcyclohexane, trans-1-propyl-4-phenylcyclohexane, cis-1-butyl-4-phenylcyclohexane, trans-1-butyl-4-phenylcyclohexane, t-butylbenzene, t-amylbenzene, o-cyclohexylfluorobenzene, and p-cyclohexylfluorobenzene are more preferred, and partially hydrogenated terphenyls and cyclohexylbenzene are particularly preferred.

The overcharge protection agents may be used alone or in a combination of two or more.

When two or more overcharge protection agents are simultaneously used, a combination of a partially hydrogenated terphenyl or cyclohexylbenzene and t-butylbenzene or t-amylbenzene, and a combination of one selected from aromatic compounds not containing oxygen such as biphenyl, alkyl biphenyls, terphenyls, partially hydrogenated terphenyls, cyclohexylbenzene, t-butylbenzene, and t-amylbenzene and one selected from oxygen-containing aromatic compounds such as diphenyl ethers and dibenzofuran are preferred from the viewpoints of well-balanced overcharge protection characteristics and high-temperature storage characteristics.

The ratio of these overcharge protection agents in the nonaqueous electrolytic solution is usually 0.1 wt % or more, preferably 0.2 wt % or more, more preferably 0.3 wt % or more, and most preferably 0.5 wt % or more, and the upper limit is usually 5 wt % or less, preferably 3 wt % or less, and most preferably 2 wt % or less. In a lower concentration than the lower limit, a desired effect of the overcharge protection agent may be hardly exhibited. Conversely, the concentration of the overcharge protection agent is too high, the battery characteristics such as high-temperature storage characteristics tend to be deteriorated.

<Other Auxiliaries>

Other auxiliaries are not particularly limited, and examples thereof are as follows:

carbonate compounds such as erythritan carbonate, spiro-bis-dimethylene carbonate, and methoxyethyl-methyl carbonate;

carboxylic anhydrides such as succinic anhydride, glutaric anhydride, maleic anhydride, itaconic anhydride, citraconic anhydride, glutaconic anhydride, diglycolic anhydride, cyclohexanedicarboxylic anhydride, cyclopentanetetracarboxylic dianhydride, and phenylsuccinic anhydride;

dicarboxylic acid diester compounds such as dimethyl succinate, diethyl succinate, diallyl succinate, dimethyl maleate, diethyl maleate, diallyl maleate, dipropyl maleate, dibutyl maleate, bis(trifluoromethyl)maleate, bis(pentafluoroethyl)maleate, and bis(2,2,2-trifluoroethyl)maleate;

spiro compounds such as 2,4,8,10-tetraoxaspiro[5.5]undecane and 3,9-divinyl-2,4,8,10-tetraoxaspiro[5.5]undecane;

sulfur-containing compounds such as ethylene sulfite, propylene sulfite, 1,3-propane sultone, 1,4-butane sultone, 1,3-propene sultone, 1,4-butene sultone, methyl methane sulfonate, ethyl methane sulfonate, methyl-methoxymethane sulfonate, methyl-2-methoxyethane sulfonate, busulfan, diethylene glycol dimethane sulfonate, 1,2-ethane diol bis(2,2,2-trifluoroethane sulfonate), 1,4-butane diol bis(2,2,2-trifluoroethane sulfonate), sulfolane, sulfolane, dimethyl sulfone, diphenyl sulfone, N,N-dimethyl methanesulfonamide, and N,N-diethyl methanesulfonamide;

nitrogen-containing compounds such as 1-methyl-2-pyrrolidinone, 1-methyl-2-piperidone, 3-methyl-2-oxazolidinone, 1,3-dimethyl-2-imidazolidinone, and N-methyl succinimide;

hydrocarbon compounds such as heptane, octane, nonane, decane, cycloheptane, methylcyclohexane, ethylcyclohexane, propylcyclohexane, n-butylcyclohexane, t-butylcyclohexane, and dicyclohexyl;

fluorinated benzenes and fluorinated toluenes such as fluorobenzene, difluorobenzene, hexafluorobenzene, and benzotrifluororide; and nitrile compounds such as acetonitrile, propionitrile, butyronitrile, malononitrile, succinonitrile, glutaronitrile, and adiponitrile.

These compounds may be used alone or in a combination of two or more.

The ratio of these auxiliaries in the nonaqueous electrolytic solution is not particularly limited in order to exhibit the effect of the present invention, but is usually 0.01 wt % or more, preferably 0.1 wt % or more, and more preferably 0.2 wt % or more. The upper limit is usually 10 wt % or less, preferably 5 wt % or less, more preferably 3 wt % or less, and most preferably 1 wt % or less. These auxiliaries can enhance capacity-maintaining characteristics and cycle characteristics after high-temperature storage, but in a lower concentration than the lower limit, the effects of the auxiliaries may be hardly exhibited. The concentration is too high, battery characteristics such as high-load discharge characteristics may be deteriorated.

The above-mentioned cyclic carbonate compounds having carbon-carbon unsaturated bonds, cyclic carbonate compounds having fluorine atoms, monofluorophosphates, and difluorophosphates, overcharge protection agents, and other auxiliaries may be used in any combination.

{Preparation of Nonaqueous Electrolytic Solution}

The nonaqueous electrolytic solution according to the present invention can be prepared by dissolving in a nonaqueous solvent an electrolyte, Compound (1) or Compound (2) and/or Compound (3), and other compounds that are blended according to need. In the preparation of the nonaqueous electrolytic solution, each raw material is preferably dehydrated in advance for reducing the amount of water when it is formed into an electrolytic solution and is preferably dehydrated so that the water content is usually 50 ppm or less, preferably 30 ppm or less, and most preferably 10 ppm or less. Furthermore, after the preparation of the electrolytic solution, dehydration and deacidification treatment may be performed.

The nonaqueous electrolytic solution of the present invention is suitable for using as an electrolytic solution of non-aqueous electrolyte batteries, in particular, secondary batteries, that is, nonaqueous electrolyte secondary batteries, for example, lithium secondary batteries.

[Nonaqueous Electrolyte Battery]

The nonaqueous electrolyte battery of the present invention includes negative and positive electrodes that can absorb and desorb lithium ions and a nonaqueous electrolytic solution and is characterized in that the nonaqueous electrolytic solution is the above-described nonaqueous electrolytic solution of the present invention.

As described above, since the nonaqueous electrolytic solution of the present invention is suitable for using as an electrolytic solution of nonaqueous electrolyte batteries, in particular, secondary batteries, that is, nonaqueous electrolyte secondary batteries, for example, lithium secondary batteries, a nonaqueous electrolyte secondary battery including the nonaqueous electrolytic solution of the present invention will be described below.

<Battery Configuration>

The nonaqueous electrolyte secondary battery according to the present invention is a nonaqueous electrolyte battery including negative and positive electrodes that can absorb and desorb lithium ions and a nonaqueous electrolytic solution, as in conventionally known nonaqueous electrolyte secondary batteries, excluding using the above-mentioned electrolytic solution of the present invention, and is usually produced by placing a porous film impregnated with the nonaqueous electrolytic solution according to the present invention between the positive electrode and the negative electrode in a case. Therefore, the shape of the secondary battery according to the present invention is not particularly limited and may be any of, for example, cylindrical-type, rectangular-type, laminated-type, coin-type, or large-type.

<Negative Electrode Active Material>

Examples of the negative electrode active material used include carbonaceous materials and metal compounds that can absorb and desorb lithium, lithium metals, and lithium alloys. These negative electrode active materials may be used alone or in a combination of two or more. Among them, the carbonaceous materials and metal compounds that can absorb and desorb lithium are preferred.

Among the carbonaceous materials, graphite and graphite whose surface is covered with higher amorphous carbon compared with graphite are particularly preferred.

The graphite has a d value (interlayer distance) of the lattice plane (002 plane) of preferably 0.335 to 0.338 nm, more preferably 0.335 to 0.337 nm, when determined from X-ray diffraction according to the Gakushin-method. The crystallite size (Lc) determined from X-ray diffraction according to the Gakushin-method is usually 30 nm or more, preferably 50 nm or more, and most preferably 100 nm or more. The ash content is usually 1 wt % or less, preferably 0.5 wt % or less, and most preferably 0.1 wt % or less.

The graphite whose surface is covered with amorphous carbon preferably includes a core material of graphite having a d value of the lattice plane (0002 plane) of 0.335 to 0.338 nm, determined from X-ray diffraction, and a carbonaceous material adhering on the surface of the core material and having a d value of the lattice plane (0002 plane) larger than that of the core material, determined from X-ray diffraction. The weight ratio of the core material and the carbonaceous material having a d value of the lattice plane (0002 plane) larger than that of the core material, determined by X-ray diffraction, is 99/1 to 80/20. By using this, a negative electrode that has a large capacity and hardly reacts with an electrolytic solution can be produced.

The particle diameter of the carbonaceous material is, as a median diameter measured by a laser diffraction scattering method, usually 1 μm or more, preferably 3 μm or more, more preferably 5 μm or more, and most preferably 7 μm or more and usually 100 μm or less, preferably 50 μm or less, more preferably 40 μm or less, and most preferably 30 μm or less.

The specific surface area of the carbonaceous material measured by a BET method is usually 0.3 m$^2$/g or more, preferably 0.5 m$^2$/g or more, more preferably 0.7 m$^2$/g or more, and most preferably 0.8 m$^2$/g or more and usually 25.0 m$^2$/g or less, preferably 20.0 m$^2$/g or less, more preferably 15.0 m$^2$/g or less, and most preferably 10.0 m$^2$/g or less.

When the carbonaceous material is analyzed by Raman spectrum using argon ion laser light for the peak intensity $I_A$ of a peak $P_A$ in the range of 1570 to 1620 cm$^{-1}$ and the peak intensity $I_B$ of a peak $P_B$ in the range of 1300 to 1400 cm$^{-1}$, the ratio of $I_B$ to $I_A$ representing an R value ($=I_B/I_A$) is preferably in a range of 0.01 to 0.7. In addition, the half width of a peak in the range of 1570 to 1620 cm$^{-1}$ is preferably 26 cm$^{-1}$ or less and most preferably 25 cm$^{-1}$ or less.

Examples of the metal compound that can absorb and desorb lithium include compounds containing metals such as Ag, Zn, Al, Ga, In, Si, Ge, Sn, Pb, P, Sb, Bi, Cu, Ni, Sr, or Ba. These metals are used as a simple substance, as an oxide, or as an alloy with lithium. In the present invention, those containing elements selected from Si, Sn, Ge, and Al are preferred, and oxides or lithium alloys of metals selected from Si, Sn, and Al are more preferred. These may be in a powder state or in a thin-film state and may be crystalline or amorphous.

The metal compounds that can absorb and desorb lithium, the oxides thereof, and the alloys thereof with lithium generally have a capacity per unit weight larger than those of carbonaceous materials typically represented by graphite and therefore are suitable for lithium secondary batteries that are required to have a higher energy density.

The average particle diameters of the metal compounds that can absorb and desorb lithium, the oxides thereof, and the alloys thereof with lithium are not particularly limited for exhibiting the effect of the present invention and are usually 50 µm or less, preferably 20 µm or less, and most preferably 10 µl or less and usually 0.1 µm or more, preferably 1 µm or more, and most preferably 2 µm or more. When the average particle diameter is larger than this upper limit, the expansion of the electrode may become large, and thereby the cycle characteristics may be deteriorated. When lower than this lower limit, the current collection may become difficult, and thereby the capacity may be insufficient.

<Positive Electrode Active Material>

The positive electrode active material is not particularly limited as long as it can absorb and desorb lithium ions. Preferred are those containing lithium and at least one transition metal. Examples thereof include lithium transition metal complex oxides and lithium-containing transition metal phosphate compounds.

The transition metal of the lithium transition metal complex oxide is preferably, for example, V, Ti, Cr, Mn, Fe, Co, Ni, or Cu. Specific examples thereof include lithium-cobalt complex oxides such as $LiCoO_2$, lithium-nickel complex oxides such as $LiNiO_2$, lithium-manganese complex oxides such as $LiMnO_2$, $LiMn_2O_4$, and $Li_2MnO_3$, and those in which the transition metal atoms as the main components of these lithium transition metal complex oxides are partially substituted by another metal such as Al, Ti, V, Cr, Mn, Fe, Co, Li, Ni, Cu, Zn, Mg, Ga, Zr, or Si. Examples of the substituted lithium transition metal complex oxide include $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiMn_{1.8}Al_{0.2}O_4$, and $LiMn_{1.5}Ni_{0.5}O_4$.

The transition metal of the lithium-containing transition metal phosphate compound is preferably, for example, V, Ti, Cr, Mn, Fe, Co, Ni, or Cu. Examples thereof include iron phosphates such as $LiFePO_4$, $Li_3Fe_2(PO_4)_3$, and $LiFeP_2O_7$, cobalt phosphates such as $LiCoPO_4$, and those in which the transition metal atoms as the main components of these lithium transition metal phosphate compounds are partially substituted by another metal such as Al, Ti, V, Cr, Mn, Fe, Co, Li, Ni, Cu, Zn, Mg, Ga, Zr, Nb, or Si.

These positive electrode active materials may be used alone or in a combination.

Furthermore, a material having a composition different from that of the main material constituting the positive electrode active material may adhere on the surface of the positive electrode active material. Examples of the material adhering on the surface include oxides such as aluminum oxide, silicon oxide, titanium oxide, zirconium oxide, magnesium oxide, calcium oxide, boron oxide, antimony oxide, and bismuth oxide; sulfates such as lithium sulfate, sodium sulfate, potassium sulfate, magnesium sulfate, calcium sulfate, and aluminum sulfate; and carbonates such as lithium carbonate, calcium carbonate, and magnesium carbonate. These materials also may be used alone or in a combination.

The amount of the material adhering on the surface is not particularly limited for exhibiting the effect of the present invention, but the lower limit is, as the mass with respect to the positive electrode active material, preferably 0.1 ppm or more, more preferably 1 ppm or more, and further preferably 10 ppm or more, and the upper limit is preferably 20% or less, more preferably 10% or less, and further preferably 5% or less. The material adhering on the surface can suppress oxidation reaction of the nonaqueous electrolytic solution on the surface of the positive electrode active material, resulting in enhancement in the battery lifetime. However, when the amount of the adhesion is too small, the effect may be insufficient, and when too large, incoming and outgoing motions of lithium ions are inhibited and thereby the resistance may be increased.

<Adhesive, Thickener, and Electrically Conductive Material>

Any adhesive for binding an active material can be used as long as it is stable for the solvent used in the production of the electrode and the electrolytic solution. Examples of the adhesive include fluorine resins such as poly(vinylidene fluoride) and polytetrafluoroethylene; polyolefins such as polyethylene and polypropylene; polymers having unsaturated bonds and copolymers thereof, such as styrene-butadiene rubber, isoprene rubber, and butadiene rubber; and acrylic acid polymers and copolymers thereof, such as ethylene-acrylic acid copolymers and ethylene-methacrylic acid copolymers. These may be used alone or in a combination.

The electrodes may further contain, for example, a thickener, an electrically conductive material, or a filler in order to enhance mechanical strength or electrical conductivity.

Examples of the thickener include carboxylmethyl cellulose, methyl cellulose, hydroxymethyl cellulose, ethyl cellulose, polyvinyl alcohol, oxidized starch, phosphorylated starch, and casein. These may be used alone or in a combination.

Examples of the electrically conductive material include metal materials such as copper and nickel and carbon materials such as graphite and carbon black. These may be used alone or in a combination.

<Production of Electrode>

The electrodes may be produced by a common method. For example, an electrode can be formed by adding an adhesive, a thickener, an electrically conductive material, a solvent, and other components to a negative or positive electrode active material, making the resulting mixture into slurry, applying the slurry to a current collector, and drying and then pressing it.

In addition, a sheet electrode can be formed by directly forming a roll of that prepared by adding an adhesive, an electrically conductive material, and other components to an active material; a pellet electrode can be formed by compression molding; or a thin film of an electrode material can be formed on a current collector by a method such as deposition, sputtering, or plating.

When the negative electrode active material is graphite, the density after the drying and pressing of the negative electrode active material layer is usually 1.45 $g/cm^3$ or more, preferably 1.55 $g/cm^3$ or more, more preferably 1.60 $g/cm^3$ or more, and most preferably 1.65 $g/cm^3$ or more.

The density after the drying and pressing of the positive electrode active material layer is usually 2.0 $g/cm^3$ or more, preferably 2.5 $g/cm^3$ or more, and more preferably 3.0 $g/cm^3$ or more.

<Current Collector>

Many types of current collectors can be used, and a metal or an alloy is generally used. Examples of the current collector of the negative electrode include copper, nickel, and stainless steel, and copper is preferred. Examples of the current collector of the positive electrode include metals such as aluminum, titanium, and tantalum and alloys thereof, and aluminum and alloys thereof are preferred.

<Separator and Outer Package>

A porous film (separator) is disposed between the positive electrode and the negative electrode for preventing short circuit. In this case, the porous film is impregnated with the electrolytic solution. The material and the shape of the porous film are not particularly limited as long as they are stable to the electrolytic solution and excellent in liquid-holding properties. Preferred examples thereof include porous sheets made of a polyolefin such as polyethylene or polypropylene and nonwoven cloths.

Any material can be used for the outer package of the battery according to the present invention, and examples thereof include iron plated with nickel, stainless steel, aluminum and alloys thereof, nickel, titanium, and laminated films.

The operating voltage range of the above-mentioned nonaqueous electrolyte secondary batteries of the present invention is generally 2 to 6 V.

EXAMPLES

The present invention will be further specifically described with Examples and Comparative Examples below, but is not limited to these Examples, within the scope not departing from the gist of the present invention.

In addition, each method for evaluating the batteries obtained in the following Examples and Comparative Examples is shown below.

[Capacity Evaluation]

A nonaqueous electrolyte secondary battery disposed between glass plates in order to enhance the adhesion between electrodes was charged to 4.2 V with a constant current equivalent to 0.2 C at 25° C. and then discharged to 3 V at a constant current of 0.2 C. This was performed three times to stabilize the battery. In the fourth cycle, the battery was charged to 4.2 V with a constant current of 0.5 C, then charged to a current value of 0.05 C at a constant voltage of 4.2 V, and then discharged to 3 V at a constant current of 0.2 C, and the initial discharge capacity was determined.

The term 1 C herein represents a current value when the reference capacity of a battery is discharged for one hour, and 0.2 C is the current value of one-fifth thereof.

[Evaluation of Continuous Charge Characteristics]

The battery after the capacity evaluation test was immersed in an ethanol bath for measuring the volume. Then, the battery was charged till 4.25 V with a constant current of 0.5 C at 60° C. and then continuously charged at a constant voltage for one week.

The battery was cooled and then immersed in an ethanol bath for measuring the volume. The amount of gas generated was determined from a change in the volume before and after the continuous charging.

After the measurement of the amount of the generated gas, the battery was discharged to 3 V at a constant current of 0.2 C at 25° C. for measuring the remaining capacity after the continuous charge test. The ratio of the discharge capacity after the continuous charge test to the initial discharge capacity was determined and was defined as the remaining capacity (%) after continuous charging.

[Evaluation of High-Temperature Storage Characteristics]

The battery after the capacity evaluation test was charged to 4.2 V with a constant current of 0.5 C at 25° C., then charged to a current value of 0.05 C at the constant voltage of 4.2 V, and then stored at 85° C. for one day. Subsequently, the battery was discharged to 3 V at a constant current of 0.2 C, and the remaining capacity after the high-temperature storage test was measured. The ratio of the discharge capacity after the storage test to the initial discharge capacity was determined and was defined as the remaining capacity (%) after high-temperature storage.

[Evaluation of Battery Characteristics after Cycle Test]

The battery after the capacity evaluation test was charged to 4.2 V with a constant current of 0.5 C at 45° C., then charged to a current value of 0.05 C at the constant voltage of 4.2 V, and then discharged to 3 V at a constant current of 1 C. This cycle was repeated for 300 cycles as a cycle test. Subsequently, the battery was charged to 4.2 V with a constant current of 0.5 C at 25° C., then charged to a current value of 0.05 C at the constant voltage of 4.2 V, and then discharged to 3 V at a constant current of 1 C. Then, 1 C discharge capacity after the cycle test was measured.

The ratio of the 10 discharge capacity after the cycle test to the initial discharge capacity was determined and was defined as 10 discharge capacity (%) after the cycle test.

Example 1

Production of Negative Electrode

Ninety-four parts by weight of natural graphite powder and 6 parts by weight of poly(vinylidene fluoride) were mixed, wherein in the natural graphite powder had a d value of a lattice plane (002 plane) by X-ray diffraction of 0.336 nm, a crystallite size (Lc) of 652 nm, an ash content of 0.07 wt %, a median diameter by a laser diffraction scattering method of 12 μm, a specific surface area by a BET method of 7.5 m$^2$/g, an R value ($=I_B/I_A$) determined by Raman spectrum analysis using argon ion laser light of 0.12, and a half width of a peak in the range of 1570 to 1620 cm$^{-1}$ of 19.9 cm$^{-1}$. Then, N-methyl-2-pyrrolidone was added thereto to form slurry. This slurry was uniformly applied to one face of a copper foil having a thickness of 12 μm and was dried. Then, the foil applied with the slurry was pressed to form a negative electrode such that the density of the negative electrode active material layer was 1.67 g/cm$^3$.

<Production of Positive Electrode>

Ninety parts by weight of LiCoO$_2$, 4 parts by weight of carbon black, and 6 parts by weight of poly(vinylidene fluoride) (manufactured by Kureha Corporation, trade name: "KF-1000") were mixed, and N-methyl-2-pyrrolidone was added thereto to form slurry. This slurry was uniformly applied to both faces of an aluminum foil having a thickness of 15 μm and was dried. Then, the foil applied with the slurry was pressed to form a positive electrode such that the density of the positive electrode active material layer was 3.2 g/cm$^3$.

<Preparation of Electrolytic Solution>

Triethyl phosphonoformate was mixed with a mixture of ethylene carbonate, ethyl methyl carbonate, and dimethyl carbonate (volume ratio: 2:3:3) under a dried argon atmosphere such that the content of the triethyl phosphonoformate in the nonaqueous solvent was 0.5 vol %. Then, sufficiently dried LiPF$_6$ was dissolved therein at a ratio of 1.0 mol/L to give an electrolytic solution.

<Production of Lithium Secondary Battery>

Using the above-mentioned positive electrode and negative electrode and a polyethylene separator, a battery element was produced by laminating the negative electrode, the separator, the positive electrode, the separator, and the negative electrode in this order. This battery element was inserted into a bag composed of a laminated film of an aluminum sheet (thickness: 40 μm) coated with resin layers on both sides, while providing the terminals of the positive and negative electrodes in a protruding condition. Then, the electrolytic solution was poured into the bag, followed by vacuum sealing to produce a sheet-type lithium secondary battery. Continuous charge characteristics and high-temperature storage characteristics were evaluated. The evaluation results are shown in Table 1.

Example 2

A sheet-type lithium secondary battery was produced as in Example 1 except that triethyl phosphonoacetate was used instead of triethyl phosphonoformate used in the preparation of the electrolytic solution of Example 1, and continuous charge characteristics and high-temperature storage characteristics were evaluated. The evaluation results are shown in Table 1.

Example 3

A sheet-type lithium secondary battery was produced as in Example 1 except that triethyl-3-phosphonopropionate was used instead of triethyl phosphonoformate used in the preparation of the electrolytic solution of Example 1, and continuous charge characteristics and high-temperature storage characteristics were evaluated. The evaluation results are shown in Table 1.

Example 4

A sheet-type lithium secondary battery was produced as in Example 1 except that the used electrolytic solution was prepared by mixing triethyl phosphonoacetate with a mixture of ethylene carbonate, ethyl methyl carbonate, and dimethyl carbonate (volume ratio: 2:3:3) such that the content of the triethyl phosphonoacetate in the nonaqueous solvent was 0.8 vol % and dissolving sufficiently dried $LiPF_6$ therein at a ratio of 1.0 mol/L, and continuous charge characteristics and high-temperature storage characteristics were evaluated. The evaluation results are shown in Table 1.

Example 5

A sheet-type lithium secondary battery was produced as in Example 1 except that the used electrolytic solution was prepared by mixing triethyl phosphonoformate with a mixture of ethylene carbonate, ethyl methyl carbonate, and dimethyl carbonate (volume ratio: 2:3:3) such that the content of the triethyl phosphonoformate in the nonaqueous solvent was 0.5 vol % and further mixing vinylene carbonate with the resulting mixture such that the content of the vinylene carbonate in the nonaqueous electrolytic solution was 2 wt % and then dissolving sufficiently dried $LiPF_6$ therein at a ratio of 1.0 mol/L, and continuous charge characteristics and high-temperature storage characteristics were evaluated. The evaluation results are shown in Table 1.

Example 6

A sheet-type lithium secondary battery was produced as in Example 5 except that triethyl phosphonoacetate was used instead of triethyl phosphonoformate used in the preparation of the electrolytic solution of Example 5, and continuous charge characteristics and high-temperature storage characteristics were evaluated. The evaluation results are shown in Table 1.

Example 7

A sheet-type lithium secondary battery was produced as in Example 5 except that triethyl-3-phosphonopropionate was used instead of triethyl phosphonoformate used in the preparation of the electrolytic solution of Example 5, and continuous charge characteristics and high-temperature storage characteristics were evaluated. The evaluation results are shown in Table 1.

Example 8

A sheet-type lithium secondary battery was produced as in Example 1 except that the used electrolytic solution was prepared by mixing triethyl phosphonoacetate with a mixture of ethylene carbonate, ethyl methyl carbonate, and dimethyl carbonate (volume ratio: 2:3:3) such that the content of the triethyl phosphonoacetate in the nonaqueous solvent was 0.5 vol % and further mixing vinylene carbonate and fluoroethylene carbonate with the resulting mixture such that the contents of the vinylene carbonate and the fluoroethylene carbonate in the nonaqueous electrolytic solution were each 1 wt % and then dissolving sufficiently dried $LiPF_6$ therein at a ratio of 1.0 mol/L, and continuous charge characteristics and high-temperature storage characteristics were evaluated. The evaluation results are shown in Table 1.

Example 9

A sheet-type lithium secondary battery was produced as in Example 1 except that the used electrolytic solution was prepared by mixing triethyl phosphonoacetate with a mixture of ethylene carbonate, ethyl methyl carbonate, and dimethyl carbonate (volume ratio: 2:3:3) such that the content of the triethyl phosphonoacetate in the nonaqueous solvent was 1 vol % and further mixing vinylene carbonate with the resulting mixture such that the content of the vinylene carbonate in the nonaqueous solvent was 2 wt % and then dissolving sufficiently dried $LiPF_6$ therein at a ratio of 1.0 mol/L, and continuous charge characteristics and high-temperature storage characteristics were evaluated. The evaluation results are shown in Table 1.

Example 10

A sheet-type lithium secondary battery was produced as in Example 1 except that the used electrolytic solution was prepared by mixing triethyl phosphonoacetate with a mixture of ethylene carbonate, ethyl methyl carbonate, and dimethyl carbonate (volume ratio: 2:3:3) such that the content of the triethyl phosphonoacetate in the nonaqueous solvent was 2 vol % and further mixing vinylene carbonate with the resulting mixture such that the content of the vinylene carbonate in the nonaqueous electrolytic solution was 2 wt % and then dissolving sufficiently dried $LiPF_6$ therein at a ratio of 1.0 mol/L, and continuous charge characteristics and high-temperature storage characteristics were evaluated. The evaluation results are shown in Table 1.

Example 11

A sheet-type lithium secondary battery was produced as in Example 1 except that the used electrolytic solution was prepared by mixing triethyl phosphonoacetate with a mixture of ethylene carbonate, ethyl methyl carbonate, and dimethyl carbonate (volume ratio: 2:3:3) such that the content of the triethyl phosphonoacetate in the nonaqueous solvent was 2 vol % and further mixing lithium difluorophosphate with the resulting mixture such that the content of the lithium difluorophosphate in the nonaqueous electrolytic solution was 0.5 wt % and then dissolving sufficiently dried $LiPF_6$ therein at a ratio of 1.0 mol/L, and continuous charge characteristics and high-temperature storage characteristics were evaluated. The evaluation results are shown in Table 1.

Comparative Example 1

A sheet-type lithium secondary battery was produced as in Example 1 except that the used electrolytic solution was prepared by dissolving sufficiently dried $LiPF_6$ in a mixture of ethylene carbonate, ethyl methyl carbonate, and dimethyl carbonate (volume ratio: 2:3:3) at a ratio of 1.0 mol/L, and continuous charge characteristics and high-temperature storage characteristics were evaluated. The evaluation results are shown in Table 1.

Comparative Example 2

A sheet-type lithium secondary battery was produced as in Example 1 except that the used electrolytic solution was prepared by mixing triethyl phosphonoacetate with a mixture of ethylene carbonate, ethyl methyl carbonate, and dimethyl carbonate (volume ratio: 2:3:3) such that the content of the triethyl phosphonoacetate in the nonaqueous solvent was 2 vol % and then dissolving sufficiently dried $LiPF_6$ therein at a ratio of 1.0 mol/L, and continuous charge characteristics and high-temperature storage characteristics were evaluated. The evaluation results are shown in Table 1.

Comparative Example 3

A sheet-type lithium secondary battery was produced as in Example 1 except that the used electrolytic solution was prepared by mixing vinylene carbonate with a mixture of ethylene carbonate, ethyl methyl carbonate, and dimethyl carbonate (volume ratio: 2:3:3) such that the content of the vinylene carbonate in the nonaqueous electrolytic solution was 2 wt % and then dissolving sufficiently dried $LiPF_6$ therein at a ratio of 1.0 mol/L, and continuous charge characteristics and high-temperature storage characteristics were evaluated. The evaluation results are shown in Table 1.

Comparative Example 4

A sheet-type lithium secondary battery was produced as in Example 1 except that the used electrolytic solution was prepared by mixing vinylene carbonate and fluoroethylene carbonate with a mixture of ethylene carbonate, ethyl methyl carbonate, and dimethyl carbonate (volume ratio: 2:3:3) such that the contents of the vinylene carbonate and the fluoroethylene carbonate in the nonaqueous electrolytic solution were each 1 wt % and then dissolving sufficiently dried $LiPF_6$ therein at a ratio of 1.0 mol/L, and continuous charge characteristics and high-temperature storage characteristics were evaluated. The evaluation results are shown in Table 1.

Comparative Example 5

A sheet-type lithium secondary battery was produced as in Example 1 except that the used electrolytic solution was prepared by mixing triethyl phosphonoacetate with a mixture of ethylene carbonate, ethyl methyl carbonate, and dimethyl carbonate (volume ratio: 2:3:3) such that the content of the triethyl phosphonoacetate in the nonaqueous solvent was 5 vol % and further mixing vinylene carbonate with the resulting mixture such that the content of the vinylene carbonate in the nonaqueous electrolytic solution was 2 wt % and then dissolving sufficiently dried $LiPF_6$ therein at a ratio of 1.0 mol/L, and continuous charge characteristics and high-temperature storage characteristics were evaluated. The evaluation results are shown in Table 1.

TABLE 1

| | Nonaqueous electrolytic solution composition | | | | | | |
|---|---|---|---|---|---|---|---|
| | Compound (1) | | Vinylene carbonate | Fluoroethylene carbonate | Lithium difluoro-phosphate | Amount of gas generated after continuous charging (mL) | Remaining capacity after continuous charging (%) | Remaining capacity after high-temperature storage (%) |
| | Type | Content*1 (vol %) | content*2 (wt %) | content*2 (wt %) | content*2 (wt %) | | | |
| Example 1 | triethyl phosphonoformate | 0.5 | — | — | — | 0.27 | 99 | 87 |
| Example 2 | triethyl phosphonoacetate | 0.5 | — | — | — | 0.20 | 98 | 87 |
| Example 3 | triethyl-3-phosphono-propionate | 0.5 | — | — | — | 0.19 | 98 | 87 |
| Example 4 | triethyl phosphonoacetate | 0.8 | — | — | — | 0.19 | 99 | 82 |
| Example 5 | triethyl phosphonoformate | 0.5 | 2 | — | — | 0.51 | 99 | 88 |
| Example 6 | triethyl phosphonoacetate | 0.5 | 2 | — | — | 0.38 | 99 | 88 |
| Example 7 | triethyl-3-phosphono-propionate | 0.5 | 2 | — | — | 0.46 | 99 | 88 |
| Example 8 | triethyl phosphonoacetate | 0.5 | 1 | 1 | — | 0.35 | 98 | 87 |
| Example 9 | triethyl phosphonoacetate | 1 | 2 | — | — | 0.35 | 99 | 86 |
| Example 10 | triethyl phosphonoacetate | 2 | 2 | — | — | 0.37 | 99 | 84 |
| Example 11 | triethyl phosphonoacetate | 2 | — | — | 0.5 | 0.28 | 99 | 85 |
| Comparative Example 1 | — | — | — | — | — | 0.29 | 95 | 87 |

TABLE 1-continued

| | Nonaqueous electrolytic solution composition | | | | | | | |
|---|---|---|---|---|---|---|---|---|
| | Compound (1) | | Vinylene carbonate | Fluoroethylene carbonate | Lithium difluoro- phosphate | Amount of gas generated after | Remaining capacity after | Remaining capacity after high- |
| | Type | Content*1 (vol %) | content*2 (wt %) | content*2 (wt %) | content*2 (wt %) | continuous charging (mL) | continuous charging (%) | temperature storage (%) |
| Comparative Example 2 | triethyl phosphonoacetate | 2 | — | — | — | 0.30 | 96 | 76 |
| Comparative Example 3 | — | — | 2 | — | — | 0.53 | 97 | 88 |
| Comparative Example 4 | — | — | 1 | 1 | — | 0.51 | 98 | 87 |
| Comparative Example 5 | triethyl phosphonoacetate | 5 | 2 | — | — | 0.54 | 98 | 72 |

*1: content in nonaqueous solvent
*2: content in nonaqueous electrolytic solution As obvious from Table 1, the batteries according to the present invention, using nonaqueous electrolytic solutions containing Compound (1) or Compound (1) and at least one compound selected from the group consisting of cyclic carbonate compounds having carbon-carbon unsaturated bonds, cyclic carbonate compounds having fluorine atoms, monofluorophosphates, and difluorophosphates, are excellent in continuous charge characteristics and high-temperature storage characteristics.

Example 12

A sheet-type lithium secondary battery was produced as in Example 1 except that the used electrolytic solution was prepared by mixing vinylene carbonate and triethyl-2-phosphonopropionate with a mixture of ethylene carbonate, ethyl methyl carbonate, and dimethyl carbonate (volume ratio: 2:3:3) under a dried argon atmosphere such that the contents of the vinylene carbonate and the triethyl-2-phosphonopropionate in the nonaqueous electrolytic solution were 2 wt % and 0.5 wt %, respectively, and then dissolving sufficiently dried LiPF$_6$ therein at a ratio of 1.0 mol/L, and continuous charge characteristics and battery characteristics after a cycle test were evaluated. The evaluation results are shown in Table 2.

Example 13

A sheet-type lithium secondary battery was produced as in Example 12 except that triethyl-2-phosphonobutyrate was used instead of triethyl-2-phosphonopropionate in the electrolytic solution of Example 12, and continuous charge characteristics and battery characteristics after a cycle test were evaluated. The evaluation results are shown in Table 2.

Example 14

A sheet-type lithium secondary battery was produced as in Example 12 except that triethyl phosphonofluoroacetate was used instead of triethyl-2-phosphonopropionate in the electrolytic solution of Example 12, and continuous charge characteristics and battery characteristics after a cycle test were evaluated. The evaluation results are shown in Table 2.

Example 15

A sheet-type lithium secondary battery was produced as in Example 12 except that ethyl(diethylphosphinyl)acetate was used instead of triethyl-2-phosphonopropionate in the electrolytic solution of Example 12, and continuous charge characteristics and battery characteristics after a cycle test were evaluated. The evaluation results are shown in Table 2.

Example 16

A sheet-type lithium secondary battery was produced as in Example 12 except that the used electrolytic solution was prepared by mixing vinylene carbonate, fluoroethylene carbonate, and triethyl-2-phosphonopropionate with a mixture of ethylene carbonate, ethyl methyl carbonate, and dimethyl carbonate (volume ratio: 2:3:3) such that the contents of the vinylene carbonate, fluoroethylene carbonate, and the triethyl-2-phosphonopropionate in the nonaqueous electrolytic solution were 1 wt %, 1 wt %, and 0.5 wt %, respectively, and then dissolving sufficiently dried LiPF$_6$ therein at a ratio of 1.0 mol/L, and continuous charge characteristics and battery characteristics after a cycle test were evaluated. The evaluation results are shown in Table 2.

Example 17

A sheet-type lithium secondary battery was produced as in Example 12 except that diethyl acetylphosphonate was used instead of triethyl-2-phosphonopropionate in the electrolytic solution of Example 12, and continuous charge characteristics and battery characteristics after a cycle test were evaluated. The evaluation results are shown in Table 2.

Example 18

A sheet-type lithium secondary battery was produced as in Example 12 except that dimethyl(2-oxopropyl)phosphonate was used instead of triethyl-2-phosphonopropionate in the electrolytic solution of Example 12, and continuous charge characteristics and battery characteristics after a cycle test were evaluated. The evaluation results are shown in Table 2.

Example 19

A sheet-type lithium secondary battery was produced as in Example 12 except that the used electrolytic solution was prepared by mixing vinylene carbonate and diethyl acetylphosphonate with a mixture of ethylene carbonate, ethyl methyl carbonate, and dimethyl carbonate (volume ratio: 2:3:3) such that the contents of the vinylene carbonate and the diethyl acetylphosphonate in the nonaqueous electrolytic solution were 2 wt % and 1 wt %, respectively, and then dissolving sufficiently dried LiPF$_6$ therein at a ratio of 1.0 mol/L, and continuous charge characteristics and battery characteristics after a cycle test were evaluated. The evaluation results are shown in Table 2.

Example 20

A sheet-type lithium secondary battery was produced as in Example 12 except that the used electrolytic was prepared by mixing vinylene carbonate, fluoroethylene carbonate, and diethyl acetylphosphonate with a mixture of ethylene carbonate, ethyl methyl carbonate, and dimethyl carbonate (volume ratio: 2:3:3) such that the contents of the vinylene carbonate, the fluoroethylene carbonate, and the diethyl acetylphosphonate in the nonaqueous electrolytic solution were 1 wt %, 1 wt %, and 0.5 wt %, respectively, and then dissolving sufficiently dried LiPF$_6$ therein at a ratio of 1.0 mol/L, and continuous charge characteristics and battery characteristics after a cycle test were evaluated. The evaluation results are shown in Table 2.

Comparative Example 6

A sheet-type lithium secondary battery was produced as in Example 12 except that the used electrolytic solution was prepared by mixing vinylene carbonate with a mixture of ethylene carbonate, ethyl methyl carbonate, and dimethyl carbonate (volume ratio: 2:3:3) such that the content of the vinylene carbonate in the nonaqueous electrolytic solution was 2 wt % and then dissolving sufficiently dried LiPF$_6$ therein at a ratio of 1.0 mol/L, and continuous charge characteristics and battery characteristics after a cycle test were evaluated. The evaluation results are shown in Table 2.

Comparative Example 7

A sheet-type lithium secondary battery was produced as in Example 12 except that the used electrolytic solution was prepared by mixing vinylene carbonate and fluoroethylene carbonate with a mixture of ethylene carbonate, ethyl methyl carbonate, and dimethyl carbonate (volume ratio: 2:3:3) such that the contents of the vinylene carbonate and the fluoroethylene carbonate in the nonaqueous electrolytic solution were each 1 wt % and then dissolving sufficiently dried LiPF$_6$ therein at a ratio of 1.0 mol/L, and continuous charge characteristics and battery characteristics after a cycle test were evaluated. The evaluation results are shown in Table 2.

Comparative Example 8

A sheet-type lithium secondary battery was produced as in Example 12 except that ethyl diethyl phosphinate was used instead of triethyl-2-phosphonopropionate in the electrolytic solution of Example 12, and continuous charge characteristics and battery characteristics after a cycle test were evaluated. The evaluation results are shown in Table 2.

Example 21

A sheet-type lithium secondary battery was produced as in Example 12 except that triethyl phosphonoacetate was used instead of triethyl-2-phosphonopropionate in the electrolytic solution of Example 12, and continuous charge characteristics and battery characteristics after a cycle test were evaluated. The evaluation results are shown in Table 2.

TABLE 2

| | Nonaqueous electrolytic solution composition | | | | Amount of gas generated after continuous charging (mL) | Remaining capacity after continuous charging (%) | 1C capacity after cycle test (%) |
|---|---|---|---|---|---|---|---|
| | Compound (2) or Compound (3) | | Vinylene carbonate content (wt %) | Fluoroethylene carbonate content (wt %) | | | |
| | Type | Content (wt %) | | | | | |
| Example 12 | triethyl-2-phosphono-propionate | 0.5 | 2 | — | 0.35 | 98 | 70 |
| Example 13 | triethyl-2-phosphono-butyrate | 0.5 | 2 | — | 0.36 | 98 | 65 |
| Example 14 | triethyl phosphono-fluoroacetate | 0.5 | 2 | — | 0.30 | 99 | 68 |
| Example 15 | ethyl(diethyl-phosphinyl)acetate | 0.5 | 2 | — | 0.38 | 98 | 69 |
| Example 16 | triethyl-2-phosphono-propionate | 0.5 | 1 | 1 | 0.34 | 98 | 72 |
| Example 17 | diethyl acetylphos-phonate | 0.5 | 2 | — | 0.38 | 99 | 73 |
| Example 18 | dimethyl(2-oxo-propyl)phosphonate | 0.5 | 2 | — | 0.39 | 98 | 72 |
| Example 19 | diethyl acetyl-phosphonate | 1 | 2 | — | 0.37 | 98 | 73 |
| Example 20 | diethyl acetyl-phosphonate | 1 | 1 | 1 | 0.36 | 98 | 75 |
| Comparative Example 6 | — | — | 2 | — | 0.53 | 97 | 47 |
| Comparative Example 7 | — | — | 1 | 1 | 0.51 | 98 | 58 |
| Comparative Example 8 | ethyl diethyl phosphinate | 0.5 | 2 | — | 0.53 | 98 | 50 |
| Example 21 | triethyl phosphono-acetate | 0.5 | 2 | — | 0.38 | 99 | 61 |

As obvious from Table 2, the batteries according to the present invention, using nonaqueous electrolytic solutions containing Compound (2), Compound (3), or Compound (2) or (3) and at least one compound selected from the group consisting of cyclic carbonate compounds having carbon-carbon unsaturated bonds, cyclic carbonate compounds having fluorine atoms, monofluorophosphates, and difluorophosphates, are low in gas generation and excellent in battery characteristics.

The present invention has been described in detail with specific Embodiments, but it is obvious to those skilled in the art that the present invention can be variously modified without departing from the gist and scope of the invention.

This application is based on Japanese Patent Application (Patent Application No. 2007-70848) filed on Mar. 19, 2007, Japanese Patent Application (Patent Application No. 2007-193525) filed on Jul. 25, 2007, and Japanese Patent Application (Patent Application No. 2007-235600) filed on Sep. 11, 2007, the entire contents of which are hereby incorporated by reference.

The invention claimed is:

1. A nonaqueous electrolytic solution comprising:
an electrolyte,
a nonaqueous solvent, and
a compound represented by at least one formula selected from the group consisting of Formula (2) and Formula (3),

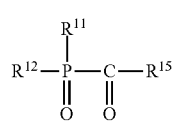

(2)

wherein for Formula (2), $R^{11}$ and $R^{12}$ are each independently selected from the group consisting of a hydrogen atom, a halogen atom, an alkyl group, an alkenyl group, an aryl group, an aralkyl group, an alkoxyalkyl group, and a group represented by $R^a$—O— in which $R^a$ represents an alkyl group, an alkenyl group, an aryl group, an aralkyl group, or an alkoxyalkyl group, wherein each of $R^{11}$ and $R^{12}$ has at most 12 carbon atoms; and $R^{15}$ represents an alkyl group having 1 to 12 carbon atoms, optionally substituted by a halogen atom, an alkenyl group having 2 to 12 carbon atoms, optionally substituted by a halogen atom, an aryl group having 6 to 12 carbon atoms, optionally substituted by a halogen atom, or an aralkyl group having 7 to 12 carbon atoms, optionally substituted by a fluorine atom; and

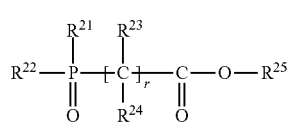

(3)

wherein for Formula (3), $R^{21}$ to $R^{24}$ are each independently selected from the group consisting of a hydrogen atom, a halogen atom, an alkyl group, an alkenyl group, an aryl group, an aralkyl group, an alkoxyalkyl group, and a group represented by $R^b$—O— in which $R^b$ represents an alkyl group, an alkenyl group, an aryl group, an aralkyl group, or an alkoxyalkyl group, wherein each of $R^{21}$ to $R^{24}$ has at most 12 carbon atoms; $R^{25}$ represents an alkyl group having 1 to 12 carbon atoms, optionally substituted by a halogen atom, an alkenyl group having 2 to 12 carbon atoms, optionally substituted by a halogen atom, an aryl group having 6 to 12 carbon atoms, optionally substituted by a halogen atom, or an aralkyl group having 7 to 12 carbon atoms, optionally substituted by a halogen atom; and r is an integer of 0 to 6, provided that when both $R^{21}$ and $R^{22}$ are alkoxy groups, r is an integer of 1 to 6, and at least one of $R^{23}$ and $R^{24}$ represent a group other than a hydrogen atom.

2. The nonaqueous electrolytic solution according to claim 1, wherein $R^{15}$ is selected from the group consisting of a methyl group, an ethyl group, an n-propyl group, an i-propyl group, an n-butyl group, an i-butyl group, a sec-butyl group, a tert-butyl group, a pentyl group, a cyclopentyl group, a cyclohexyl group, a vinyl group, an allyl group, a phenyl group, a tolyl group, a xylyl group, a benzyl group, a phenethyl group, a trifluoromethyl group, a trifluoroethyl group, a pentafluoroethyl group, a 2-fluorovinyl group, a 3-fluoro-2-propenyl group, a 2-fluorophenyl group, a 3-fluorophenyl group, a 4-fluorophenyl group, a 2,4-difluorophenyl group, a 3,5-difluorophenyl group, a 2-fluorobenzyl group, a 3-fluorobenzyl group, a 4-fluorobenzyl group, a 2,4-difluorobenzyl group, and a 3,5-difluorobenzyl group.

3. The nonaqueous electrolytic solution according to claim 1, wherein $R^{25}$ is selected from the group consisting of a methyl group, an ethyl group, an n-propyl group, an i-propyl group, an n-butyl group, an i-butyl group, a sec-butyl group, a tert-butyl group, a pentyl group, a cyclopentyl group, a cyclohexyl group, a vinyl group, an allyl group, a phenyl group, a tolyl group, a xylyl group, a benzyl group, a phenethyl group, a trifluoromethyl group, a trifluoroethyl group, a pentafluoroethyl group, a 2-fluorovinyl group, a 3-fluoro-2-propenyl group, a 2-fluorophenyl group, a 3-fluorophenyl group, a 4-fluorophenyl group, a 2,4-difluorophenyl group, a 3,5-difluorophenyl group, a 2-fluorobenzyl group, a 3-fluorobenzyl group, a 4-fluorobenzyl group, a 2,4-difluorobenzyl group, and a 3,5-difluorobenzyl group.

4. The nonaqueous electrolytic solution according to claim 1, comprising 0.001 to 10 wt % of the compound.

5. The nonaqueous electrolytic solution according to claim 1, further comprising at least one compound selected from the group consisting of a cyclic carbonate compound having a carbon-carbon unsaturated bond, a cyclic carbonate compound having a fluorine atom, a monofluorophosphate, and a difluorophosphate.

6. The nonaqueous electrolytic solution according to claim 5, comprising at least one cyclic carbonate compound having a fluorine atom selected from the group consisting of fluoroethylene carbonate, 4,5-difluoro-1,3-dioxolan-2-one, and 4-fluoro-5-methyl-1,3-dioxolan-2-one.

7. The nonaqueous electrolytic solution according to claim 5, comprising 0.01 to 20 wt % of the cyclic carbonate compound having a fluorine atom.

8. The nonaqueous electrolytic solution according to claim 1, further comprising at least one cyclic carbonate compound having a carbon-carbon unsaturated bond selected from the group consisting of vinylene carbonate, vinyl ethylene carbonate, 4-methyl-4-vinyl ethylene carbonate, and 4,5-divinyl ethylene carbonate.

9. The nonaqueous electrolytic solution according to claim 8, comprising 0.01 to 8 wt % of the cyclic carbonate compound having a carbon-carbon unsaturated bond.

10. The nonaqueous electrolytic solution according to claim 1, comprising the compound represented by Formula (2).

11. The nonaqueous electrolytic solution according to claim 1, comprising the compound represented by Formula (3) wherein r is 0 or 1.

12. The nonaqueous electrolytic solution according to claim 1, comprising 0.01 to 4 wt % of the compound.

13. The nonaqueous electrolytic solution according to claim 1, comprising 0.1 to 0.8 wt % of the compound.

14. The nonaqueous electrolytic solution according to claim 1, further comprising an overcharge protection agent.

15. The nonaqueous electrolytic solution according to claim 14, comprising 0.1 to 5 wt % of the overcharge protection agent.

16. The nonaqueous electrolytic solution according to claim 1, wherein the compound is at least one selected from the group consisting of triethyl-2-phosphonopropionate, triethyl-2-phosphonobutyrate, triethyl phosphonofluoroacetate, ethyl(diethylphosphinyl)acetate, and diethyl acetylphosphonate.

17. The nonaqueous electrolytic solution according to claim 16, comprising 0.001 to 10 wt % of the compound.

18. The nonaqueous electrolytic solution according to claim 16, further comprising vinylene carbonate.

19. A nonaqueous electrolyte battery comprising the nonaqueous electrolyte solution of claim 1.

\* \* \* \* \*